United States Patent
Minaei Bidgoli et al.

(10) Patent No.: US 11,556,909 B2
(45) Date of Patent: Jan. 17, 2023

(54) UNIVERSAL PAYMENT CHANNELS

(71) Applicant: Visa International Service Association, San Francisco, CA (US)

(72) Inventors: Mohammad Mohsen Minaei Bidgoli, Palo Alto, CA (US); Ranjit Kumaresan, Sunnyvale, CA (US); Mahdi Zamani, Palo Alto, CA (US); Sivanarayana Gaddam, Santa Clara, CA (US)

(73) Assignee: Visa International Service Association, San Francisco, CA (US)

(*) Notice: Subject to any disclaimer, the term of this patent is extended or adjusted under 35 U.S.C. 154(b) by 370 days.

(21) Appl. No.: 16/834,954

(22) Filed: Mar. 30, 2020

(65) Prior Publication Data
US 2021/0049567 A1 Feb. 18, 2021

Related U.S. Application Data

(60) Provisional application No. 62/888,326, filed on Aug. 16, 2019.

(51) Int. Cl.
*G06Q 20/10* (2012.01)
*G06Q 20/38* (2012.01)
(Continued)

(52) U.S. Cl.
CPC ......... *G06Q 20/108* (2013.01); *G06Q 20/389* (2013.01); *G06Q 20/3827* (2013.01);
(Continued)

(58) Field of Classification Search
CPC ............ G06Q 20/108; G06Q 20/3827; G06Q 20/389; H04L 9/0637; H04L 9/0643; H04L 9/50; H04L 2209/56
(Continued)

(56) References Cited

U.S. PATENT DOCUMENTS

| 10,102,265 | B1* | 10/2018 | Madisetti ............... G06F 16/27 |
| 2016/0292672 | A1 | 10/2016 | Fay et al. |
| 2017/0053249 | A1 | 2/2017 | Tunnell et al. |
| 2017/0132625 | A1 | 5/2017 | Kennedy |

(Continued)

FOREIGN PATENT DOCUMENTS

| CN | 110795501 A | 2/2020 |
| KR | 101920015 | 11/2018 |

(Continued)

OTHER PUBLICATIONS

Watanabe et al., "Niji: Bitcoin Bridge Utilizing Payment Channels", arXiv:1810.10194v1 [cs.DC], Oct. 24, 2018, 12 pages) (Year: 2018).*

(Continued)

*Primary Examiner* — James D Nigh
(74) *Attorney, Agent, or Firm* — Kilpatrick Townsend & Stockton LLP

(57) ABSTRACT

Systems and methods for transferring value. A method includes posting, by a user device to a blockchain, a deposit transaction comprising a deposit value and conditions and updating, by the user device, a state according to a transaction amount. The method also includes transmitting, by the user device, a state update of the state to a server computer and responsive to transmitting the state update, and receiving, by the user device, a payment complete message comprising a tuple from the server computer. The method also includes verifying, by the user device, the conditions and processing, by the user device, a server deposit transaction on the blockchain in response to verifying.

20 Claims, 8 Drawing Sheets

(51) Int. Cl.
*H04L 9/06* (2006.01)
*H04L 9/00* (2022.01)

(52) U.S. Cl.
CPC .......... *H04L 9/0637* (2013.01); *H04L 9/0643* (2013.01); *H04L 9/50* (2022.05); *H04L 2209/56* (2013.01)

(58) Field of Classification Search
USPC .......................................................... 705/50
See application file for complete search history.

(56) References Cited

U.S. PATENT DOCUMENTS

| | | | |
|---|---|---|---|
| 2019/0095879 A1* | 3/2019 | Eyal | G06Q 20/223 |
| 2019/0139037 A1* | 5/2019 | Khalil | G06Q 20/0655 |
| 2019/0164153 A1 | 5/2019 | Agrawal et al. | |
| 2019/0354518 A1* | 11/2019 | Zochowski | G06F 16/2379 |
| 2020/0026712 A1 | 1/2020 | Madisetti et al. | |
| 2021/0027294 A1 | 1/2021 | Trevethan | |

FOREIGN PATENT DOCUMENTS

| | | |
|---|---|---|
| WO | WO 2018/020389 A2 | 2/2018 |
| WO | 2018224943 | 12/2018 |
| WO | 2020008218 A1 | 1/2020 |
| WO | 2022020523 A1 | 1/2022 |

OTHER PUBLICATIONS

Miller et al., "Sprites and State Channels: Payment Networks that Go Faster than Lightning", arXiv:1702.05812v2 [cs.CR] Nov. 30, 2017, 24 pages (Year: 2017).*

"Smart Contracts for the Network", retrieved from https://raiden-network-specification.readthedocs.io/en/latest/smart_contracts.html, Mar. 20, 2018, 46 pages (Year: 2018).*

Coleman et al., "Counterfactual: Generalized State Channels", Jun. 12, 2018, 48 pages (Year: 2018).*

Lind et al., "Teechain: A Secure Payment Network with Asynchronous Blockchain Access", arXiv:1707.05454v4 [cs.CR], Oct. 26, 2019, 30 pages (Year: 2019).*

Poon et al. ("The Bitcoin Lightning Network: Scalable Off-Chain Instant Payments", Jan. 14, 2016, 59 pages) (Year: 2016).*

Bentov et al., "How to use bitcoin to design fair protocols," in *Annual Cryptology Conference.* Springer, Berlin, Heidelberg, 38 pages (2014).

Poon et al., "The Bitcoin Lightning Network: Scalable Off-Chain Instant Payments", Jan. 14, 2016, pp. 1-59.

PCT/US2020/045997, "International Search Report and Written Opinion", Nov. 24, 2020, 10 pages.

Aliev, "Lightning Network in Depth, Part 1: Payment Channels", Available Online at https://medium.com/softblocks/lightning-network-in-depth-part-1-payment-channels-b943607950dd, Mar. 5, 2018, pp. 1-15.

Bentov et al., "How to Use Bitcoin to Design Fair Protocols", ICIAP: International Conference on Image Analysis and Processing, 17th International Conference, Aug. 17, 2014, pp. 421-439.

EP20855215.8, "Extended European Search Report", dated Aug. 31, 2022, 9 pages.

Poon et al., "The Bitcoin Lightning Network", Draft Version 0.5, The Wayback Machine, Available Online at https://web.archive.org/web/20170629090805if/http://lightning.network/lightning-network-paper-DRAFT-0.5.pdf, Jun. 9, 2017, pp. 1-22.

EP20855215.8, "Supplemental European Search Report", dated Sep. 20, 2022, 1 pages.

* cited by examiner

UNIVERSAL PAYMENT CHANNELS

CROSS REFERENCE TO RELATED APPLICATIONS

This application is a non-provisional application of U.S. provisional application No. 62/888,326, filed on Aug. 16, 2019, which is herein incorporated by reference in its entirety.

BACKGROUND

As cryptocurrency becomes more widespread, there is an increasing number of users with cryptocurrency accounts and an increasing number of different cryptocurrency systems. In general, currency on one blockchain of one cryptocurrency cannot be transferred to a blockchain of a different cryptocurrency. With traditional currency, this exchange from one currency to another can be handled by a trusted authority such as a bank. However, a blockchain based cryptocurrency does not typically have a trusted authority that can carry out the conversion. Instead, the blockchain creates a distributed authority that stores information about transactions. Thus there is no central authority between multiple cryptocurrencies that can perform the conversion while maintaining security.

Additionally, transactions on a blockchain can be very time consuming. Each interaction with the blockchain can take an extended period of time to be verified and appear on the blockchain. In order for a message to appear on a blockchain, the message may be added to a block, and that block may need to be verified before it is added to the blockchain. The verification process may also involve mining which can be time consuming. This process can take a long time, on the order of minutes or hours. Over the course of several messages, such a process can take hours or even a full day to process a single transaction.

Embodiments address these issues individually and collectively.

BRIEF SUMMARY

One embodiment includes a method comprising the steps of posting, by a user device to a blockchain, a deposit transaction comprising a deposit value and conditions and updating, by the user device, a state according to a transaction amount. The method also includes the steps of transmitting, by the user device, a state update of the state to a server computer, and responsive to transmitting the state update, receiving, by the user device, a payment complete message comprising a tuple from the server computer. The method also includes the steps of verifying, by the user device, the conditions, and processing, by the user device, a server deposit transaction on the blockchain in response to verifying.

Another embodiment includes a user device comprising a processor; and a computer-readable medium comprising code, executable by the processor, for implementing a method including the steps of: posting a deposit transaction comprising a deposit value and conditions and updating a state according to a transaction amount. The method also includes the steps of transmitting a state update of the state to a server computer, and responsive to transmitting the state update, receiving a payment complete message comprising a tuple from the server computer. The method also includes the steps of verifying the conditions, and processing a server deposit transaction on the blockchain in response to verifying.

Another embodiment includes method comprising the steps of posting, by a server computer to a blockchain, a deposit transaction comprising a deposit value and conditions and receiving, by the server computer from a user device, a state update. The method also includes the steps of updating, by the server computer, a state according to a transaction amount and transmitting, by the server computer to the user device, a payment complete message. The method also includes the steps of verifying, by the server computer, the conditions, and processing, by the server computer, a server deposit transaction on the blockchain in response to verifying.

Further details regarding embodiments of the invention can be found in the Detailed Description and the Figures.

DETAILED DESCRIPTION

Figure 1:
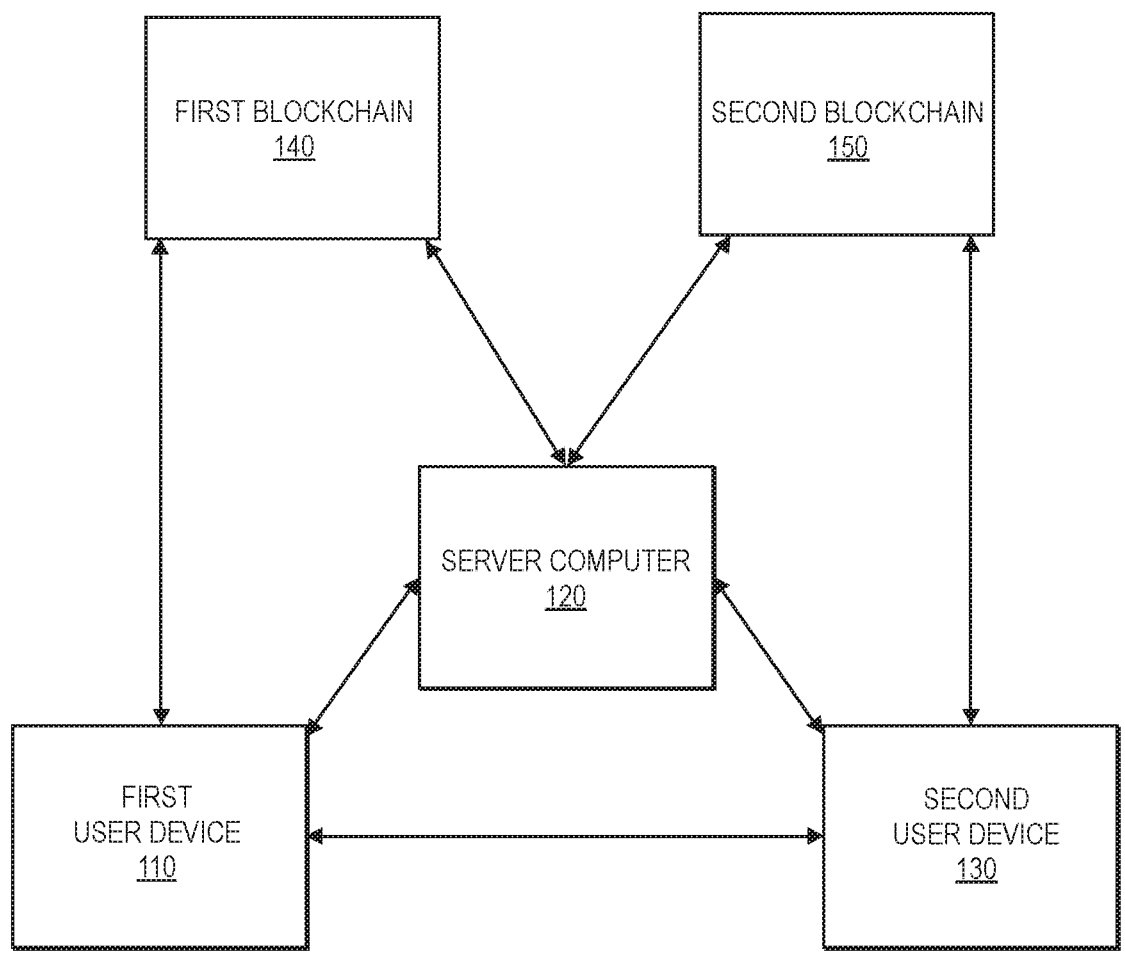
FIG. 1 shows a diagram of a system according to embodiments.

Embodiment can provide systems and methods for facilitating transactions between different blockchain cryptocurrencies. As cryptocurrencies become more widespread, there are more users that have cryptocurrency that they want to send to another user. However, the increase in the number of different blockchain-based cryptocurrencies has led to the rise of a number of different blockchains. With a traditional fiat currency, there is usually a central authority, such as a bank or payment processing network, that can receive the payment in one currency and complete the payment in a different currency. Blockchains, however, are typically based on the premise that there is no trusted central authority that maintains a single transaction ledger. In a blockchain system, the ledger is typically maintained by a network of computer devices that may not necessarily trust each other. A public ledger can increase transparency and accountability in the network, but at the expense of an authority that can interact with other blockchains in a way that represents the interests of a user of the blockchain.

Embodiments can provide solutions that use a third party server computer to facilitate transactions between users that use cryptocurrencies on different blockchains. In embodiments of the invention, the server computer may have an account on each of the blockchains. Furthermore, embodiments may not require trust between the users and the server computer. Users and the server computer can make or record deposits on their respective blockchains to ensure that all parties follow protocols, without requiring that the parties trust each other.

In some embodiments, if one party fails to complete the protocol, for example, in an attempt to fraudulently complete a transaction, the fraudulent party may lose their deposit and the other parties may receive the deposit. As an illustration, a first user and a second user may transact with each other in a series of transactions during a predetermined timeframe. The second user may attempt to behave dishonestly by alleging that a particular payment was never made to the first user, when in fact it had been made. If this occurs, the second user may risk losing some or all of their deposit to the first user. Thus, even if the deposit does not fully deter fraudsters, in embodiments of the invention, the victims of the fraud can still be compensated, reducing the effects of fraudulent activity.

Embodiments have another advantage in that they can minimize the number of messages that are posted to a particular blockchain. After a message is sent to a blockchain in a conventional system such as a Bitcoin blockchain, a block is determined for the message, and this process can take minutes or hours. This may be a reasonable time frame for situations where only one or two messages are posted to the blockchain to complete the transaction. However, more complicated systems may include large numbers of messages to authenticate and authorize transactions, and posting each one on a blockchain can result in a process that takes hours or days for a single transaction. Instead, embodiments can use a small number of messages to post a transaction to a blockchain, and can send messages though other channels that do not involve blockchains. That is, in embodiment, multiple transactions can be conducted between two user devices using a new messaging scheme, without the need to write to write each and every message to a blockchain. Further, although it could be used, mining need not be used in embodiments of the invention. Thus, the benefits of using blockchains can be obtained, while improving the transaction speed relative to conventional systems.

Prior to discussing embodiments of the invention, some terms can be described in further detail.

A "user" may include an individual or a computational device. In some embodiments, a user may be associated with one or more personal accounts and/or mobile devices. In some embodiments, the user may be a cardholder, account holder, or consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device, a laptop or desktop computer, a wearable device, etc.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "distributed ledger" may include a database that is shared among multiple nodes across a network. Entities corresponding to each node may store identical copies of the ledger at a given time. The entities may have permission to make changes or additions to the ledger. When the ledger is changed, the participating entities may receive the updated ledger. An example of a distributed ledger can include a blockchain, wherein interactions are verified before being recorded to the blockchain in a block of transactions.

A "blockchain" can be a distributed database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "private key" may include a cryptographic key that forms a private key of a public/private key pair. A private key may be used to decrypt data encrypted with a public key. System FIG. 1 shows a block diagram of a system 100 according to embodiments. System 100 may comprise a first user device 110, a server computer 120, a second user device 130, a first blockchain 140, and a second blockchain 150. In embodiments, there may be more than two user devices and/or more than two blockchains. Although the first and second blockchains 140, 150 are each represented by a block, the first and second blockchains 140, 150 may reside on any suitable device or computer within the system 100. For instance, in some embodiments, there may be multiple user devices associated with a particular blockchain and each of those user devices may store the blockchain. Any of the devices in system 100 may be in operative communication via a suitable communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like. The parties may communicate with each other and the ledgers via secure and authenticated communication channels.

First user device 110 and second user device 130 can be devices operated by a user that can interact with blockchains. The first user device 110 and the second user device 130 may be, for example, a smartphone, a laptop, or a server computer, each with a cryptocurrency wallet. The cryptocurrency wallet that is used in embodiments of the invention may store one or more blockchain addresses of the user device. In some embodiments, the first user device 110 and/or the second user device 130 may also have the functionality of the server computer 120.

Server computer 120 may be a computer that can mediate interactions between user devices such as the first user device 110 and the second user device 130. The server computer 120 may be interact with blockchains including first blockchain 140 and second blockchain 150. In some embodiments, server computer 120 may be operated by a central authority, such as a payment processing network or an issuing bank.

First blockchain 140 and second blockchain 150 may be ledgers for cryptocurrencies. Examples of cryptocurrencies can include Bitcoin and Ethereum. User devices (e.g., first user device 110 and second user device 130) may have addresses that function as identifiers to receive transactions from other users that conduct transactions using a blockchain. In embodiments, the address can be a public key or a hash assigned to a particular user device.

The server computer 120 may have at least one address on each of the first blockchain 140 and the second blockchain 150. In some embodiments, the server computer 120 may have a plurality of addresses on a particular blockchain, and each address may represent a payment channel between the server computer and a user device that is on the same blockchain. In some embodiments, each ledger may be an append-only ledger, and each ledger maintains a list of public addresses corresponding to the value that the parties own on the ledger. Each user device may have at least one such address in at least one of the ledgers and the server computer 120 may have at least one address in every ledger.

Figure 2:
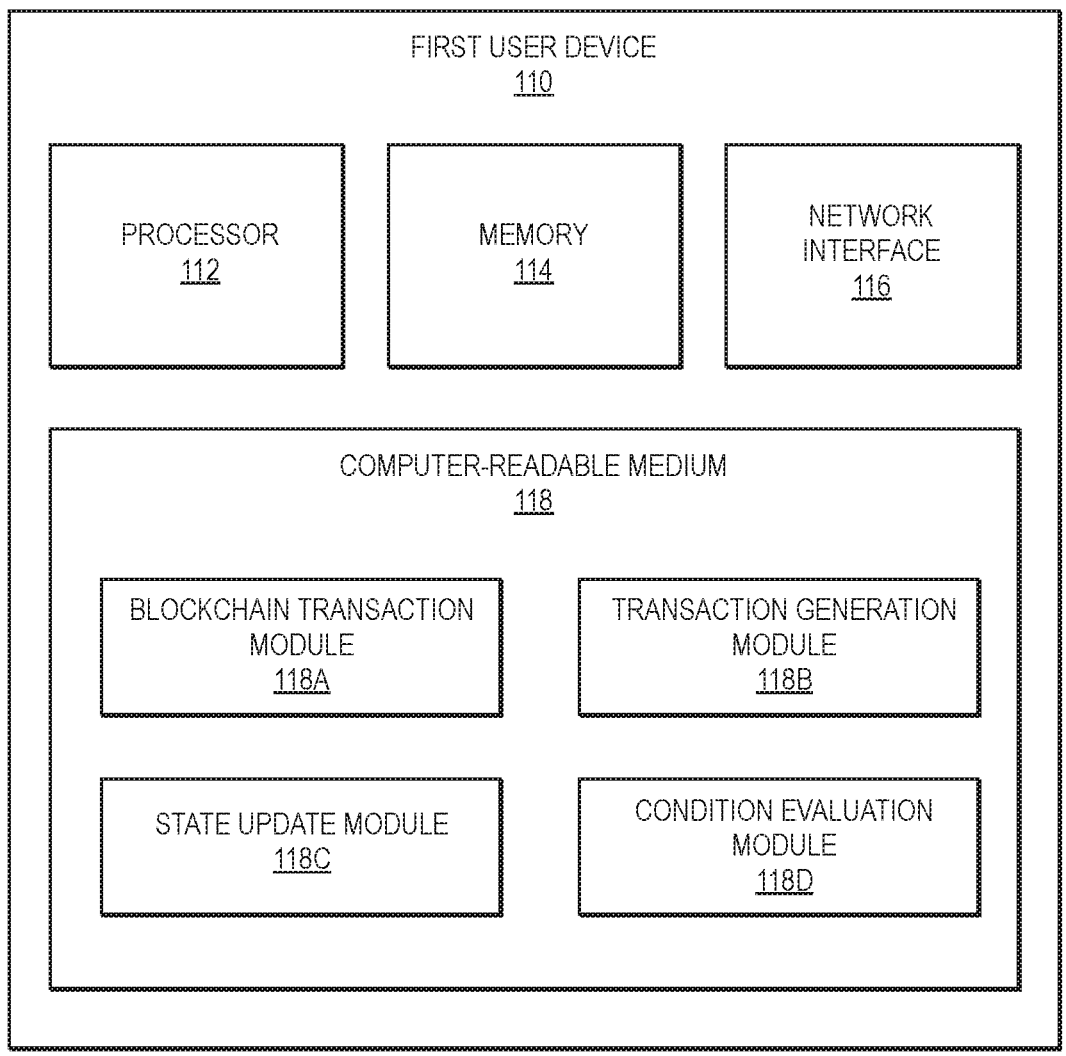
FIG. 2 shows a block diagram of a first user device according to embodiments.

FIG. 2 shows a block diagram of a first user device 110. This figure may also describe second user device 130, or other user devices in system 100. First user device 110 may comprise a processor 112 operatively coupled to a memory 114, a network interface 116, and a non-transitory computer-readable medium 118. Computer-readable medium 118 may comprise computer code including a blockchain transaction module 118A, a transaction generation module 118B, a state update module 118C, and a condition evaluation module 118D.

The processor 112 may be implemented as one or more integrated circuits (e.g., one or more single core or multicore microprocessors and/or microcontrollers). The processor 112 may be used to control the operation of the first user device 110. The processor 112 can execute a variety of programs in response to program code or computer-readable code stored in memory 114. The processor 112 may include functionality to maintain multiple concurrently executing programs or processes.

The memory 114 may be implemented using any combination of any number of non-volatile memories (e.g., flash memory) and volatile memories (e.g., DRAM, SRAM), or any other non-transitory storage medium, or a combination of media.

Network interface 116 may be configured to connect to one or more communication networks to allow first user device 110 to communicate with other entities such as server computer 120, first blockchain 140, etc. For example, communication with the server computer 120 can be direct, indirect, and/or via an API.

Computer-readable medium 118 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 118 may be any combination of such storage or transmission devices.

Blockchain transaction module 118A, in conjunction with the processor 112, can provide an interface between the first user device 110 and the first blockchain 140. In some embodiments, blockchain transaction module 118A may be a cryptocurrency wallet application. Blockchain transaction module 118A may store keys and identifiers of the first user device 110 for completing transactions on the blockchain. Blockchain transaction module 118A, in conjunction with the processor 112, can format messages to be sent to the first blockchain 140. Blockchain transaction module 118A, in conjunction with the processor 112, can post deposit transactions to the first blockchain 140. In some embodiments, the deposit transactions may be claim or refund transactions (Bentov and Kumaresan, "How to use bitcoin to design fair protocols," in *Annual Cryptology Conference*. Springer, Berlin, Heidelberg, 2014). Blockchain transaction module 118A, in conjunction with the processor 112, can also claim some or all of a claim-or-refund transaction on the first blockchain 140.

Transaction generation module 118B, in conjunction with the processor 112, can generate transaction messages according to embodiments. Transaction generation module 118B, in conjunction with the processor 112, can generate messages including authorization messages, transaction requests, and state update messages. Transaction messages may comprise payment tuples, certificate tuples, transaction identifiers, and other data. In some embodiments, transaction generation module 118B can also generate signatures for the messages, and verify signatures received from other devices (e.g., the server computer 120 and/or the second user device 130).

State update module 118C, in conjunction with the processor 112, can maintain and update a state of the first user device 110. The state can be a tuple that comprises a state identifier (and/or a transaction identifier), a first user device balance, and a server balance. State update module 118C, in conjunction with the processor 112, can update the state based on transaction messages. The state update module 118C may maintain one state for the first user device, and may maintain a plurality of state tuples for transactions with a plurality of other user devices.

Condition evaluation module 118D, in conjunction with the processor 112, can evaluate transaction conditions for determining whether to complete or refund a transaction. The condition evaluation module 118D can determine the appropriate conditions to evaluate for a transaction. For example, condition evaluation module 118D can determine whether first use device 110 has received a state update message from all parties in a transaction (e.g., server computer 120 and second user device 130). If one or more state update messages are missing, condition evaluation module 118D may use a first set of conditions to evaluate a transaction. Alternatively, if all state update messages have been received, condition evaluation module 118D may use a second set of conditions to evaluate the transaction. In embodiments, condition evaluation module 118D can pass the results of the conditions to blockchain transaction module 118A so that blockchain transaction module 118A can complete the appropriate transaction.

In some embodiments, computer-readable medium 118 may comprise code, executable by processor 112, for implementing a method comprising at least the steps of: a) posting, to a blockchain, a deposit transaction comprising a deposit value and conditions; b) updating a state according to a transaction amount; c) transmitting a state update of the state to a server computer; d) responsive to step c), receiving a payment complete message comprising a tuple from the server computer; e) verifying the conditions; and f) processing a server deposit transaction on the blockchain in response to verifying.

In some embodiments, second user device 130 may have the same or different features and/or components as the first user device 110. The second user device 130 may comprise a computer-readable medium (such as computer-readable medium 118) that comprises code, executable by a processor (such as processor 112), for implementing a method that comprises posting, to a blockchain, a deposit transaction comprising a deposit value and conditions; receiving an payer authorization message from a first user device, the payer authorization message comprising a tuple comprising a transaction identifier, a transaction amount, and a validity time; receiving a first server authorization message comprising the tuple from a server computer; transmitting a second authorization complete message comprising the tuple to the first user device; receiving a payment initiation message comprising the transaction identifier from the first user device; updating, by the second user device, a state according to the transaction amount in response to receiving the payment initiation message; transmitting, by the second user device, a first payment complete message comprising the tuple to the first user device; receiving a second payment complete message comprising the tuple from the server computer; verifying the conditions; and processing a server deposit transaction on the blockchain in response to verifying.

Figure 3:
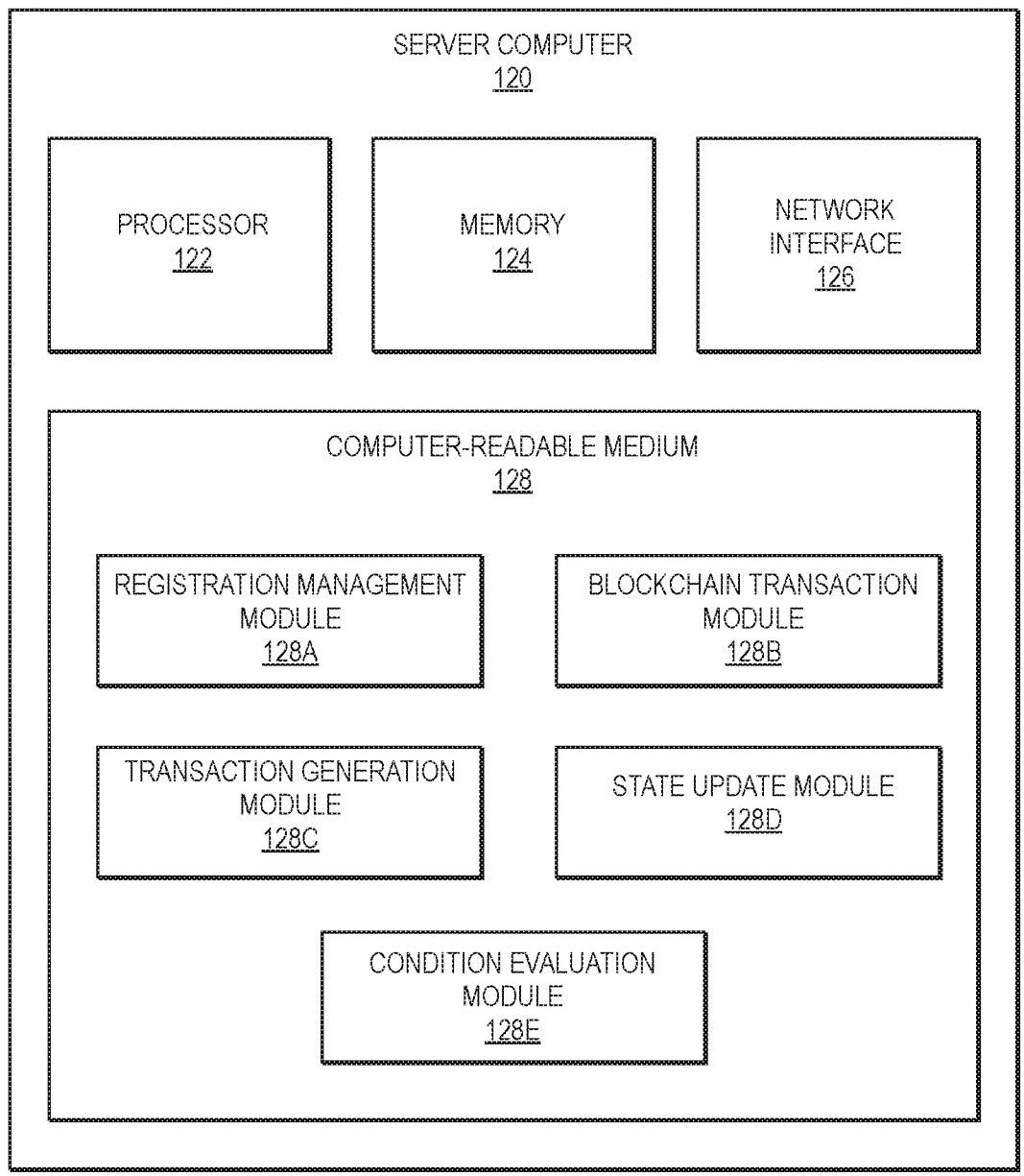
FIG. 3 shows a block diagram of a server computer according to embodiments.

FIG. 3 shows a block diagram of a server computer 120. Server computer 120 may comprise a processor 122, a memory 124, a network interface 126, and a computer-readable medium 128. Computer-readable medium 128 may comprise a registration management module 128A, a blockchain transaction module 128B, a transaction generation module 128C, a state update module 128D, and a condition evaluation module 128E.

The processor 122, the memory 124, the network interface 126, and the computer-readable medium 128 may be similar to the corresponding components of the first user device 110 of FIG. 2.

Registration management module 128A, in conjunction with the processor 122, may store information about the user devices that are registered. Each user device may be associated with an identifier (e.g., an MSIDN, a phone number, a blockchain address), an identifier of the cryptocurrency (or cryptocurrencies) that that the user has an account with, a deposit value, and a validity time. When server computer 120 receives a registration request message from a user device, registration management module 128A, in conjunction with the processor 122, can determine the appropriate blockchain and cryptocurrency, then generate the deposit transactions. When server computer 120 receives a transaction message from a user device, registration management module 128A can verify that the user device is registered with the server computer and that the validity time has not passed.

Blockchain transaction module 128B, in conjunction with the processor 122, can manage blockchain interactions and cryptocurrency transactions of the server computer 120. In some embodiments, blockchain transaction module 128B may be similar to blockchain transaction module 118A of first user device 110 in FIG. 2. Blockchain transaction module 128B, in conjunction with the processor 122, can maintain an index of a plurality of blockchain addresses for server computer 120 for the plurality of blockchains (e.g., first blockchain 140 and second blockchain 150).

Transaction generation module 128C, in conjunction with the processor 122, can generate transaction messages. A transaction message may be, for example, an authorization response, a transaction response, etc. In some embodiments, transaction generation module 128C may be similar to transaction generation module 118B of first user device 110 in FIG. 2.

State update module 128D, in conjunction with the processor 122, can maintain a plurality of states of the server computer 120 and update the states in response to transaction messages. In some embodiments, state update module 128D may be similar to state update module 118C of first user device 110 in FIG. 2. State update module 128D may maintain a plurality of states for server computer 120, each state associated with a different user device. For example, if server computer 120 is transacting with first user device 110 and second user device 130, state update module 128D may maintain a first state with a server balance associated with the transaction with first user device 110 and a second state with a second server balance associated with the transaction with second user device 130.

Condition evaluation module 128E, in conjunction with the processor 122, can evaluate payment conditions. In some embodiments, condition evaluation module 128E may be similar to condition evaluation module 118D of first user device 110 in FIG. 2.

In some embodiments, computer-readable medium 128 may comprise code, executable by processor 122, for implementing a method that includes a) posting, by a server computer to a blockchain, a deposit transaction comprising a deposit value and conditions; b) receiving, by the server computer from a user device, a state update; c) updating, by the server computer, a state according to a transaction amount; d) transmitting, by the server computer to the user device, a payment complete message; e) verifying, by the server computer, the conditions; and f) processing, by the server computer, a server deposit transaction on the blockchain in response to verifying.

Simple Payment Channel

Figure 4:
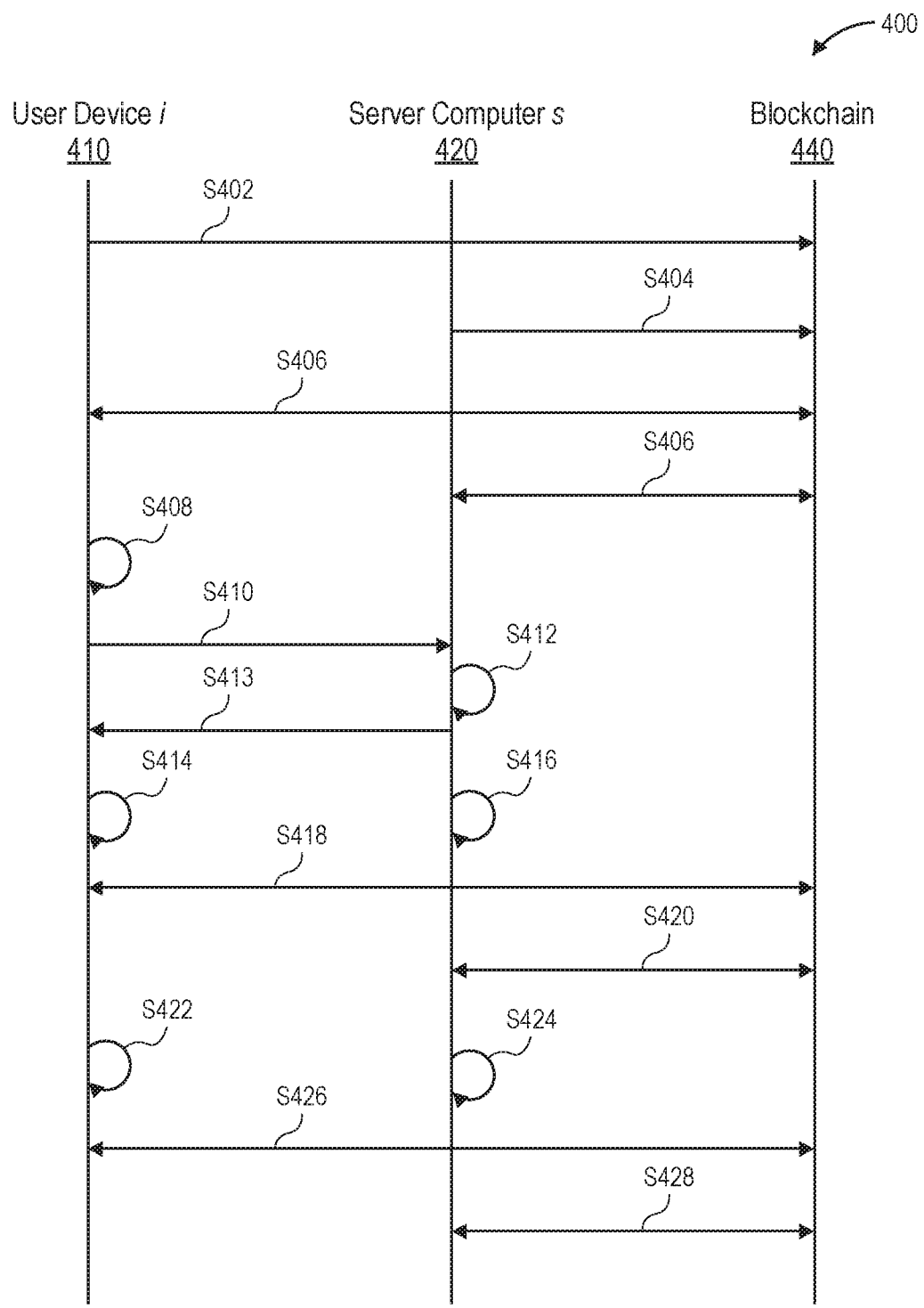
FIG. 4 shows a swim lane diagram of a process according to embodiments.

A process for a simple payment channel according to embodiments can now be described with respect to FIG. 4. Relative to the embodiments that will be discussed with respect to FIGS. 5-8 below which describe methods and systems involving three entities and two blockchains, the embodiments in FIG. 4 can be conducted by two entities and a single blockchain. Illustratively, in the simple payment channel embodiment, a user device i 410 may transact with a server computer s 420. Both the user device i 410 and the server computer s 420 may have accounts with a blockchain 440.

The simple payment channel may have associated parameters and conditions. $\phi_{i \to s}^{(\tau)}$, $\phi_{s \to i}^{(\tau)}$, $\varphi_{i \to s}^{(\tau+1)}$ and $\varphi_{s \to i}^{(\tau+1)}$ can be payment conditions for a transaction between user device i 410 and server computer s 420 with settlement times $\tau$ and $\tau+1$ (i.e., the period of time after $\tau$) respectively, as defined below. $\Gamma=(vk_i, vk_s, q)$ can be a public parameter comprising a user public key $vk_i$ of the user device i 410, a server public key $vk_s$ of the server computer s 420, and a deposit amount q. The user public key $vk_i$ may be associated with a user secret key $sk_i$, and the server public key $vk_s$ may be associated with a server secret key $sk_s$. The user public key $vk_i$ can be used to verify signatures generated with the user secret key $sk_i$. Similarly, the server public key $vk_s$ can be user to verify signatures generated with the server secret key $sk_s$. The deposit amount q may be an integer value in a neutral currency (e.g., U.S. dollars). In some embodiments, these parameters may be established to prior interactions, as part of registration, or earlier. Some parameters, like settlement times $\tau$ and $\tau+1$, may be general to the system. In some embodiments, parameters may depend on users (e.g., a more trustworthy user may have a longer validity time).

Deposit Phase

Before any transactions between a user device and a server computer can occur, they need to conduct deposit transactions on a blockchain. In step S402, user device i 410 can create and post two user deposit transactions: a first user deposit transaction $tx_1 \leftarrow CR_{i \to s}(\phi_{i \to s}^{(\tau)}(\_; \Gamma), coin(q))$ and a second user deposit transaction $tx_3 \leftarrow CR_{i \to s}(\varphi_{i \to s}^{(\tau+1)}(\_; \Gamma), coin(q))$. Each deposit transaction may be a claim or refund transaction (e.g., as noted by the notation "CR" above) for a deposit amount q as coin(q) with conditions $\phi_{i \to s}^{(\tau)}$ and $\varphi_{i \to s}^{(\tau+1)}$ and parameters $\Gamma$. The underscore in the conditions $\phi_{i \to s}^{(\tau)}$ and $\varphi_{i \to s}^{(\tau+1)}$ denotes that inputs to the conditions may be variable depending upon details of the transactions. For example, the inputs may differ depending upon whether or not fraudulent behavior is suspected. Further details regarding the conditions and inputs to those conditions are discussed below. User device i 410 can then post the deposit transactions with an address of the user device i 410 to blockchain 440. In posting, the user device i 410 can send the deposit transaction to the blockchain 440, then the deposit transaction can be added to a block of the blockchain 440.

In step S404, server computer s 420 can create and post two server deposit transactions: a first server deposit transaction $tx_2 \leftarrow CR_{s \to i}(\phi_{s \to i}^{(\tau)}(\_; \Gamma), coin(q))$ and a second server deposit transaction $tx_4 \leftarrow CR_{s \to i}(\varphi_{s \to i}^{(\tau+1)}(\_; \Gamma), coin(q))$. Each deposit transaction may be a claim-or-refund transaction for the deposit amount q as coin(q) with conditions $\phi_{s \to i}^{(\tau)}$ and $\varphi_{s \to i}^{(\tau+1)}$ and parameters $\Gamma$. The conditions are defined below. Server computer s 420 can post the deposit transactions with an address of the server computer s 420 to blockchain 440. In posting, the server computer s 420 can send the deposit transaction to the blockchain 440, then the deposit transaction can be added to a block of the blockchain 440.

In step S406, user device i 410 and server computer s 420 can check blockchain 440 to determine if both parties have posted the two deposit transactions. Either party can abort the process if they do not see the two deposit transactions from the other party by time $\tau$. If a party aborts the process, each deposit transaction may be refunded to the party that posted it. Otherwise, user device i 410 and server computer s 420 can begin the Payment phase. Each party may be initialized with an initial state $st_{i,s}$ comprising a transaction identifier $id_{i,s}$, a user device balance $b_i$ of the deposit amount q, and a server balance $b_s$ of the deposit amount q. For example, an initial state $st_{i,s}$ for a deposit amount q=10 may be $st_{i,s}=(id_{i,s}=0, b_i=10, b_s=10)$, comprising transaction identifier $id_{i,s}=0$, user device balance $b_i=10$, and server balance $b_s=10$. Other embodiments may be initialized with different values.

Payment Phase

In some embodiments, once the deposit phase has been completed, payments may be made between the user device and the server computer. For example, in the payment phase, user device i 410 can send a transaction amount z as coin(z) to server computer s 420 before validity time $\tau$. The transaction amount z may be an integer in a neutral currency (e.g., U.S. dollars). In other embodiments, server computer s 420 can send some value to user device i 410. The steps of the payment phase may be performed multiple times, in either direction, before time $\tau$. For example, the validity time $\tau$ may be 24 hours, and in those 24 hours, the user device i 410 may send two transactions of z=3 and z=7 to the server computer s 420 and the server computer s 420 may send one transaction of z=5 to the user device i 410.

In step S408, user device i 410 can update its state $st_{i,s}$ according to the transaction amount z to form an updated state $st'_{i,s}$. The updated state $st'_{i,s}$ generated with an update state function "UpdateST," the latest state $st_{i,s}$ (e.g., $st_{i,s}=(id_{i,s}=0, b_i=10, b_s=10)$) and the transaction amount z by $st'_{i,s} \leftarrow \text{UpdateST}(st_{i,s}, z)$. In updating the state, the user device i 410 may increment the transaction identifier $id_{i,s}$ (e.g., add one to the previous transaction identifier). The user device i 410 can also decrease the user device balance $b_i$ by the transaction amount z and increase the server balance $b_s$ by the transaction amount z. For example, for a state $st_{i,s}=(id_{i,s}=0, b_i=10, b_s=10)$ and a transaction amount z=3, the updated state may be $st'_{i,s}=(id_{i,s}=1, b_i=7, b_s=13)$. User device i 410 can then generate a user state signature $\sigma_{i,st}'$ of the updated state $st'_{i,s}$ with the user secret key $sk_i$ by $\sigma_{i,st}' \leftarrow \text{Sign}(st'_{i,s}, sk_i)$.

In step S410, user device i 410 can send a state update (state-update, z, $st'_{i,s}$, $\sigma_{i,st}'$) comprising the transaction amount z, the updated state $st'_{i,s}$, and the user state signature $\sigma_{i,st}'$ to server computer s 420. "state-update" may be an indicator notifying the server computer s 420 of the initiated transaction.

In step S412, server computers 420, upon receiving the state update (state-update, z, st'$_{i,s}$, $\sigma_{i,st}$'), can validate the state update and update its own state st$_{i,s}$. Server computer s 420 can verify that the user device balance st$_{i,s}$. b$_i$ from the local state st$_{i,s}$ less the transaction amount z is greater than zero by st$_{i,s}$. b$_i$−z>0. This can verify that the user device i 410 has sufficient balance for the transaction. Server computer s 420 can also verify the correctness of the updated state by updating the local state st$_{i,s}$ with the transaction amount z and comparing the result to the received updated state st'$_{i,s}$ by checking that UpdateST (st$_{i,s}$, z)=st'$_{i,s}$. Server computer s 420 can verify the user state signature $\sigma_{i,st}$' with the updated state st'$_{i,s}$ and the user public key vk$_i$ by checking that SigVerify (vk$_i$, st$_{i,s}$, $\sigma_{i,st}$')=1. If the result of SigVerify is equal to 1 (i.e., indicating the signature is valid), then the signature can be verified.

If server computer s 420 verifies the updated state, the balance, and the signature, server computer s 420 can then replace the state st$_{i,s}$ with the updated state st'$_{i,s}$. Server computer s 420 can then output a payment complete message (pay-complete, st'$_{i,s}$) comprising the updated state st'$_{i,s}$. "pay-complete" may be an indicator to the user device i 410 that the server computer s 420 updated its state successfully. The server computer s 420 can transmit, and the user device i 410 can receive, the payment complete message (step S413). If server computer s 420 is not able to verify one or more of the state, the balance, and the signature, server computer s 420 can output a payment failure message (pay-fail, st'$_{i,s}$) comprising the updated state st'$_{i,s}$. "pay-fail" may be an indicator to the user device i 410 that the server computer s 420 was not able to update its state, and the user device i 410 and/or the server computer s 420 may abort the process.

The steps S408 to S412 can be repeated a plurality of times between user device i 410 and server computer s 420 for any transaction amount z, so long as the transaction amount z is less than the current balance of the sending party. At any point in time, the balance of the user device i 410 and the server computer s 420 may total the 2q that each party deposited. Note that in embodiments, the payment phase can occur without communicating with the blockchain 440. Thus, no actual value may be transferred between the user device i 410 and the server computer s 420. Instead, each party can maintain a state st$_{i,s}$ indicating what the balance should be.

Settlement Phase

In embodiments, when user device i 410 and server computer s 420 have finished transacting, they can begin a settlement process. During the settlement process, the conditions of each deposit transaction can be evaluated to determine how much of each deposit should be refunded and how much can be claimed by the other party. Settlement may occur in two stages. In the first stage, the first deposit transaction from each entity can be verified to allocate cryptocurrency based on the final balance of each entity. In the second stage, the second deposit transaction from each entity can be verified to make any adjustments to the amounts, for example, if it is determined that one of the entities was dishonest in the first round. If none of the entities is behaving dishonestly, then the deposit amounts in the second stage are refunded to the respective entities. In some embodiments, settlement may begin automatically at validity time τ. In embodiments, even if user device i 410 and server computer s 420 have finished transacting, settlement may not begin until validity time τ. The first round of settlement may occur at time τ and the second round may occur later at time τ+1.

In step S414, user device i 410 can construct the witness for conditions $\phi_{s \to i}^{(\tau)}$ in the first round of settlement. A "witness" is a term used in cryptography, that can be a tuple (or other value) that can be used to verify an expected result. User device i 410 may have its latest state st$_{i,s}$, and a server state signature $\sigma_{s,st}$ which may be the signature of server computer s 420 for its latest state. User device i 410 can generate a user state signature $\sigma_{i,st}$ of the latest state st$_{i,s}$ using the user secret key sk$_i$ by computing $\sigma_{i,st} \leftarrow$ Sign(st$_{i,s}$, sk$_i$). The user device i 410 can also generate a user identifier signature $\sigma_{i,stid}$ of the tuple (st$_{i,s}$, id$_{i,s}$), which may be latest state with the identifier of the state, with the user secret key sk$_i$ by $\sigma_{i,stid} \leftarrow$ Sign((st$_{i,s}$, id$_{i,s}$), sk$_i$). User device i 410 can then construct a user witness ST$_i$=(st$_{i,s}$, $\sigma_{i,stid}$, $\sigma_{i,st}$, $\sigma_{s,st}$) comprising the state st$_{i,s}$, the user identifier signature $\sigma_{i,stid}$, the user state signature $\sigma_{i,st}$, and the server state signature $\sigma_{s,st}$.

In step S416, server computer s 420 can construct the witness for conditions $\phi_{i \to s}^{(\tau)}$ in the first round of settlement. Server computer s 420 may have its latest state st$_{i,s}$, and the user state signature $\sigma_{s,st}$ which may be the signature of user device i 410 for its latest state. Server computer s 420 can generate a server state signature $\sigma_{s,st}$ of the latest state st$_{i,s}$ using the server secret key sk$_s$ by computing $\sigma_{s,st} \leftarrow$ Sign (st$_{i,s}$, sk$_s$). The server computer s 420 can also generate a server identifier signature $\sigma_{s,stid}$ of the tuple (st$_{i,s}$, id$_{i,s}$), which may be the latest state with the identifier of the state, with the server secret key sk$_s$ by $\sigma_{s,stid} \leftarrow$ Sign ((st$_{i,s}$, id$_{i,s}$), sk$_s$). Server computer s 420 can then construct a server witness ST$_s$=(st$_{i,s}$, $\sigma_{s,stid}$, $\sigma_{s,st}$, $\sigma_{i,st}$) comprising the state st$_{i,s}$, the server identifier signature $\sigma_{s,stid}$, the server state signature $\sigma_{s,st}$, and the user state signature $\sigma_{i,st}$.

As an example, consider a payment channel with a deposit value of q=10, where each party deposits a total of 2q=20, or coin(2q), on the blockchain. At the end of the payment phase, the user balance b$_i$ may be b$_i$=7 and the server balance b$_s$ may be b$_s$=13. In this example, it may assumed that all signatures are valid, and that the state st$_{i,s}$ of the user device i 410 and the server computer s 420 are equal.

In step S418, user device i 410 can verify the first user conditions $\phi_{s \to i}^{(\tau)}$(ST$_i$; Γ) using the user witness ST$_i$ and the parameters Γ. After verifying the conditions, the user device i 410 can process a server deposit transaction (which can include claiming and/or refunding the server deposit transaction) on the blockchain 430. For example, the user device i 410, in response to verifying can attempt to claim a first server deposit transaction. The first user conditions may be computed as $$\phi_{s \to i}(ST_i; \Gamma) = \begin{pmatrix} SigVerify(vk_i, st_{i,s}, \sigma_{i,st}) \wedge SigVerify(vk_s, st_{i,s}, \sigma_{s,st}) \\ \wedge SigVerify(vk_i, (st_{i,s}, id_{i,s}), \sigma_{i,stid}) \wedge \\ (b_s < b_i) \end{pmatrix} \times (b_i - q)$$

The first user conditions can include four terms combined with logical AND operators Λ, the result then multiplied by the difference between the user device balance b$_i$ and the deposit value q. The first term can be a verification of the user state signature $\sigma_{i,st}$ with the state st$_{i,s}$ and the user public key vk$_i$, where the verification is 1 if the signature is valid and 0 if the signature is invalid. The second term can be a verification of the server state signature $\sigma_{s,st}$ with the state st$_{i,s}$ and the server public key vk$_s$, where the verification is 1 if the signature is valid and 0 if the signature is invalid. The third term can be a verification of the user identifier signature $\sigma_{i,stid}$ with the tuple $(st_{i,s}, id_{i,s})$ and the user public key $vk_i$, where the verification is 1 if the signature is valid and 0 if the signature is invalid. This term can be used to verify that the state identifier $id_{i,s}$ is the state identifier that was signed by the user device i. This can be used to ensure that there is agreement between a state identifier of the user device I and a state identifier of the server s. If there is no agreement, then it can be assumed that someone has submitted an incorrect state. The fourth term can compare the server balance $b_s$ to the user balance $b_i$, outputting 1 if the server balance $b_s$ is less than the user balance $b_i$ and 0 otherwise. For example, for the example values, $\phi_{s\rightarrow i}(ST_i; \Gamma)=(1\wedge1\wedge1\wedge(13<7))\times(7-10)=(1\wedge1\wedge1\wedge0)\times(-3)=0$. In this example, all signatures may be assumed to be valid. In order to compute $\phi_{s\rightarrow i}^{(\tau)}(ST_i; \Gamma)$ from $\phi_{s\rightarrow i}(ST_i; \Gamma)$, the result of $\phi_{s\rightarrow i}(ST_i; \Gamma)$ can be multiplied by the value (CurrTime( )<$\tau$), which returns 1 If the current time is less than the validity time $\tau$ and 0 otherwise.

If $\phi_{s\rightarrow i}^{(\tau)}(ST_i; \Gamma)>0$, then user device i 410 can claim (or have a right to at least a portion of) the corresponding transaction (e.g., $tx_2$ from server computer s 420) at time $\tau$. That is, the blockchain can allocate some or all of deposit transaction $tx_2$ to the user device i. In this example, $\phi_{s\rightarrow i}^{(\tau)}(ST_i; \Gamma)=0$, so the user device i 410 may not be able to claim transaction $tx_2$. Instead, the transaction $tx_2$ with the value q=10, or coin(q=10), may be refunded to the server computer s 420.

In step S420, server computer s 420 can verify the first server conditions $\phi_{i\rightarrow s}^{(\tau)}(ST_s; \Gamma)$ and attempt to claim a first deposit transaction. Generically, the server computer can process a server deposit transaction on the blockchain in response to verifying. The first server conditions may be computed as $$\phi_{s\rightarrow i}(ST_s; \Gamma) = \left( \begin{array}{c} SigVerify(vk_i, st_{i,s}, \sigma_{i,st}) \wedge SigVerify(vk_s, st_{i,s}, \sigma_{s,st}) \\ \wedge\ SigVerify(vk_i, (st_{i,s}, id_{i,s}), \sigma_{i,stid}) \wedge \\ (b_s > b_i) \end{array} \right) \times (b_s - q)$$

The first server conditions can include four terms combined with logical AND operators $\wedge$, the result multiplied by the difference between the server device balance $b_s$ and the deposit value q. The first term can be a verification of the user state signature $\sigma_{i,st}$ with the state $st_{i,s}$ and the user public key $vk_i$, where the verification is 1 if the signature is valid and 0 if the signature is invalid. The second term can be a verification of the server state signature $\sigma_{s,st}$ with the state $st_{i,s}$ and the server public key $vk_s$, where the verification is 1 if the signature is valid and 0 if the signature is invalid. The third term can be a verification of the server identifier signature $\sigma_{s,stid}$ with the tuple $(st_{i,s}, id_{i,s})$ and the server public key $vk_s$, where the verification is 1 if the signature is valid and 0 if the signature is invalid. The fourth term can compare the server balance $b_s$ to the user balance $b_i$, outputting 1 if the server balance $b_s$ is greater than the user balance $b_i$ and 0 otherwise. For example, for the example values, $\phi_{i\rightarrow s}(ST_s; \Gamma)=(1\wedge1\wedge1\wedge(13>7))\times(13-10)=(1\wedge1\wedge1\wedge1)\times(3)=3$. In this example, all signatures may be assumed to be valid. In order to compute $\phi_{i\rightarrow s}^{(\tau)}(ST_s; \Gamma)$ from $\phi_{i\rightarrow s}(ST_s; \Gamma)$, the result of $\phi_{i\rightarrow s}(ST_s; \Gamma)$ can be multiplied by the value (CurrTime( )<$\tau$), which returns 1 if the current time is less than the validity time $\tau$ and 0 otherwise.

If $\phi_{i\rightarrow s}^{(\tau)}(ST_s; \Gamma)>0$, then server computer s 420 can claim the corresponding transaction (e.g., $tx_1$ from user device i 410) at time $\tau$. In the example, $\phi_{i\rightarrow s}^{(\tau)}(ST_s; \Gamma)=3>0$, so the server computer s 420 can claim (i.e., have a right to at least a portion of) transaction $tx_1$. When claiming $tx_1$, server computer s 420 can claim a value equal to the result of $\phi_{i\rightarrow s}^{(\tau)}(ST_s; \Gamma)$ of the total deposit value. In the example, server computer s 420 can claim coin(3) of $tx_1$. The remaining q−3, or coin(q−3)=coin(10−3) can be refunded to the user device i 410. In the example, after both transactions $tx_1$ and $tx_2$ have been claimed, user device i 410 may have a cryptocurrency balance of coin(7) and server computer s 420 may have a cryptocurrency balance of coin(13). Note that the balances now align with the user balance $b_i$ and the server balance $b_s$ stored in the state $st_{i,s}$.

In embodiments, if transactions $tx_1$ and $tx_2$ are not claimed by time $\tau$ they will be refunded to user device i 410 and server computer s 420 respectively. In some embodiments, a party may not be able to claim a transaction if it is behaving fraudulently, in which case the other party can be refunded, so that it does not steal from the other party.

The second round of the settlement process may then begin. If in the first round, both entities behaved honestly, the second round may end with the second deposits being refunded to the corresponding party. If a party behaved dishonestly (e.g., by generating a witness with an outdated state in an attempt to get more money), the second round may detect the dishonesty and use the second deposits to make corrections.

In step S422, user device i 410 can verify the second user conditions $\varphi_{s\rightarrow i}^{(\tau+1)}(ST_s, ST_i; \Gamma)$ using the user witness $ST_i$, the server witness $ST_s$, and the parameters $\Gamma$ and attempt to claim a second deposit transaction. The user device i 410 can extract the server witness $ST_s$ from the transaction $tx_1$ and the user witness $ST_i$ from the transaction $tx_2$. In some embodiments, user device i 410 may already have the user witness $ST_i$. User device i 410 can then compute second user conditions $\varphi_{s\rightarrow i}^{(\tau+1)}(ST_s, ST_i; \Gamma)$. The second user conditions can be $$\varphi_{s\rightarrow i}(ST_s, ST_i; \Gamma) = \left( \begin{array}{c} \phi_{i\rightarrow s}(ST_s; \Gamma) > 0 \wedge \phi_{s\rightarrow i}(ST_i; \Gamma) > 0 \\ \wedge\ ST_s.id_{i,s} < ST_i.id_{i,s} \end{array} \right) \times \phi_{i\rightarrow s}(ST_s; \Gamma)$$

The second user conditions can include three terms combined by logical AND operators $\wedge$, and the result is multiplied by the result of the first server conditions $\phi_{i\rightarrow s}(ST_s; \Gamma)$. In some embodiments, the user device i 410 may compute the first server conditions $\phi_{i\rightarrow s}(ST_s; \Gamma)$. In other embodiments, the user device i 410 may receive the result of the first server conditions $\phi_{i\rightarrow s}(ST_s; \Gamma)$ from the server computer s 420. The first term of the second user conditions can compare the first server conditions $\phi_{i\rightarrow s}(ST_s; \Gamma)$ to zero, outputting 1 if the first server conditions are greater than zero and 0 otherwise. The second term can compare the first user conditions $\phi_{s\rightarrow i}(ST_i; \Gamma)$ to zero, outputting 1 if the first user conditions $\phi_{s\rightarrow i}(ST_i; \Gamma)$ are greater than zero and 0 otherwise. The third term can compare the state identifier from the server witness $ST_s$. $id_{i,s}$ to the state identifier from the user witness $ST_i$. $id_{i,s}$, outputting 1 if the state identifier from the server witness $ST_s$. $id_{i,s}$ is less than the state identifier from the user witness $ST_i$. $id_{i,s}$ and 0 otherwise. For the example, $\varphi_{s\rightarrow i}(ST_s, ST_i; \Gamma)=(1\wedge0\wedge0)\times3=0$. In this example, all signatures may be assumed to be valid.

As another example, the server computer s 420 may attempt to behave dishonestly in order to steal funds from the user device i 410. For example, in the first round of settlement, the user device i 410 may have generated a user witness with the correct state ($id_{i,s}=2$, $b_i=14$, $b_s=6$) for the first conditions. The result of the first user conditions, following the equation of step S418, is then $\phi_{s \to i}(ST_i; \Gamma)=4$, and the user device i 410 may have claimed coin(4) of the first deposit from the server computer s 420. However, the server computer s 420 may lie and use an older state to generate a server witness with the state ($id_{i,s}=1$, $b_i=7$, $b_s=13$) that shows the server computer s 420 has having more money. Then the result of the first server conditions, following step S420, is then $\phi_{i \to s}(ST_s; \Gamma)=3$ and the server computer s 420 can fraudulently claim coin(3) of the deposit from the user device. If the server computer s 420 was not cheating, then it should have claimed coin(0). However, since it claimed coin(3), the total server balance at the end of this first round is coin(9) and balance of the user device i 410 is coin(11). This is instead of the correct values of the server computer s 420 having coin(6) and the user device i 410 having coin(14).

The user device i 410 can then use the results of the first round of the settlement phase to determine if the server computer s 420 behaved dishonestly. In calculating the second user conditions, both $\phi_{i \to s}(ST_s; \Gamma)>0$ and $\phi_{s \to i}(ST_i; \Gamma)>0$ may be true, indicating that both the user device i 410 and the server computer s 420 claimed part of the first round, though only the user device i 410 should have. Furthermore, $ST_s.id_{i,s}<ST_i.id_{i,s}$ may be true as the server computer s 420 used an older state with $ST_s.id_{i,s}=1$ instead of the correct $ST_i.id_{i,s}=2$. In an honest scenario, $ST_s.id_{i,s}=ST_i.id_{i,s}$, but it does not here, since the server computer s 420 behaved dishonestly and tried to use a prior state to claim the user's deposit transaction. The second user conditions may be $\varphi_{s \to i}(ST_s, ST_i; \Gamma)=(1 \wedge 1 \wedge 1) \times 3=3$, and thus the user device i 410 may claim coin(3) from the second deposit of the server computer s 420. This compensates for the coin(3) that the server computer s 420 fraudulently claimed in the first round of the settlement process.

In order to compute $\varphi_{s \to i}^{(\tau+1)}(ST_s, ST_i; \Gamma)$ from $\varphi_{s \to i}(ST_s, ST_i; \Gamma)$, the result of $\varphi_{s \to i}(ST_s, ST_i; \Gamma)$ can be multiplied by the value (CurrTime( )<τ+1), which returns 1 if the current time is less than the validity time τ+1 and 0 otherwise. In some embodiments, the validity time τ+1 may be one time step past the validity time τ. In other embodiments, the validity time τ+1 may be another time after the validity time τ. For example, the validity time τ may be 8 hours and the validity time τ+1 may be 8 hours and 1 minute.

In step S424, server computer s 420 can verify the second server conditions $\varphi_{i \to s}^{(\tau+1)}(ST_s, ST_i; \Gamma)$ using the user witness $ST_s$, the server witness $ST_s$, and the parameters Γ and attempt to claim a second deposit transaction. The server computer s 420 can extract the server witness $ST_s$ from the transaction $tx_1$ and the user witness $ST_i$, from the transaction $tx_2$. In some embodiments, server computer s 420 may already have the server witness $ST_s$. Server computer s 420 can then compute second server conditions $\varphi_{i \to s}^{(\tau+1)}(ST_s, ST_i; \Gamma)$. The second server conditions can be $$\varphi_{i \to s}(ST_s, ST_i; \Gamma) = \begin{pmatrix} \phi_{i \to s}(ST_s; \Gamma) > 0 \wedge \phi_{s \to i}(ST_i; \Gamma) > 0 \\ \wedge\ ST_s.id_{i,s} > ST_i.id_{i,s} \end{pmatrix} \times \phi_{s \to i}(ST_i; \Gamma)$$

The second server conditions can include three terms combined by logical AND operators Λ, the result multiplied by the result of the first user conditions $\phi_{s \to i}(ST_i; \Gamma)$. In some embodiments, the server computer s 420 may compute the first user conditions $\phi_{s \to i}(ST_i; \Gamma)$. In other embodiments, the server computer s 420 may receive the result of the first user conditions $\phi_{s \to i}(ST_i; \Gamma)$ from the user device i 410. The first term of the second server conditions can compare the first server conditions $\phi_{i \to s}(ST_s; \Gamma)$ to zero, outputting 1 if the first server conditions are greater than zero and 0 otherwise. The second term can compare the first user conditions $\phi_{s \to i}(ST_i; \Gamma)$ to zero, outputting 1 if the first user conditions $\phi_{s \to i}(ST_i; \Gamma)$ are greater than zero and 0 otherwise. The third term can compare the state identifier from the server witness $ST_s.id_{i,s}$ too the state identifier from the user witness $ST_i.id_{i,s}$, outputting 1 if the state identifier from the server witness $ST_s.id_{i,s}$ is greater than the state identifier from the user witness $ST_i.id_{i,s}$ and 0 otherwise. For the example, $\varphi_{i \to s}(ST_s, ST_i; \Gamma)=(1 \wedge 0 \wedge 0) \times 0=0$. In this example, all signatures may be assumed to be valid.

In order to compute $\varphi_{i \to s}^{(\tau+1)}(ST_s, ST_i; \Gamma)$ from $\varphi_{i \to s}(ST_s, ST_i; \Gamma)$, the result of $\varphi_{i \to s}(ST_s, ST_i; \Gamma)$ can be multiplied by the value (CurrTime( )<τ+1), which returns 1 if the current time is less than the validity time τ+1 and 0 otherwise. In some embodiments, the validity time τ+1 may be one time step past the validity time τ. In other embodiments, the validity time τ+1 may be another time after the validity time τ.

In step S426, if $\varphi_{s \to i}^{(\tau+1)}(ST_s, ST_i; \Gamma)>0$, then user device i 410 can claim a corresponding transaction (e.g., $tx_4$ from server computers 420). In the example, $\varphi_{s \to i}^{(\tau+1)}(ST_i, ST; \Gamma)=0$, so the user device i 410 may not be able to claim transaction $tx_4$. Instead, the transaction $tx_4$ with the value q=10, or coin(q=10), may be refunded to the server computer s 420.

In step S428, if $\varphi_{i \to s}^{(\tau+1)}(ST_s, ST_i; \Gamma)>0$, then server computer s 420 can claim a corresponding transaction (e.g., $tx_3$ from user device i 410). In the example, $\varphi_{s \to i}^{(\tau+1)}(ST_s, ST_i; \Gamma)=0$, so the server computer s 420 may not be able to claim transaction $tx_3$. Instead, the transaction $tx_3$ with the value q=10, or coin(q=10), may be refunded to the user device i 410.

If $tx_3$ and $tx_4$ are not claimed at time τ+1 they will be refunded to party i and s respectively. In some embodiments, a party may not be able to claim a transaction if it is behaving fraudulently, in which case the other party can be refunded, so that it does not steal from the other party. In the example, after all four transactions have been claimed or refunded, user device i 410 may have a balance of coin(17) and server computer s 420 may have a balance of coin(23). Thus, each party may have received the value that was deposited, and the transaction amount may have been transferred.

Universal Payment Channel

A universal payment channel may provide methods for three entities to conduct transactions between two cryptocurrencies. While the steps illustrated below with reference to FIG. 5-8 may be similar to the steps of FIG. 4, the addition of a third entity can allow transactions to be generalized to multiple users interacting with different blockchains.

Parameters and Notation

Parameters used in embodiments can include a user public key $vk_i$ from a sending party (e.g., a first user device i) and a server public key $vk_s$ for a server computer s. User public key $vk_i$ may be related to a user secret key $sk_i$, and server public key $vk_s$ may be related to a server secret key $sk_s$. Another parameter may be a deposit coin amount q, the amount of cryptocurrency that is posted to a cryptocurrency blockchain as a deposit. Another parameter can be a validity time τ, a time by which transactions (e.g., deposit transactions) are to be claimed. Another parameter can be a security parameter λ, a scalar.

$st_{i,j}=(id_{i,j}, b_i, b_j)$ can denote the latest state of the payment channel between parties i and j (e.g., a first user device i and a second user device j), where the identifier $id_{i,j}$ is a monotonically increasing counter for the transaction states. $b_i$ and $b_j$ are the balance of parties i and j (e.g., the first user device i and the second user device j) in the transaction identified by $id_{i,j}$.

Hash: $\{0,1\}^* \rightarrow \{0,1\}^\lambda$ can be a collision-resistant hash function, with security parameter $\lambda$. $\{0,1\}^*$ can indicate the set of all binary strings of arbitrary size and $\{0,1\}^\lambda$ can indicate the set of all binary strings of exactly length $\lambda$, thus the hash function can map arbitrary bit strings to strings of a fixed size.

$Sign(m,sk_p)$=op denotes a signature function that generates a signature op for a party p of a message m using private key sky. SigVerify $(vk_p, m, \sigma_p)$ denotes a signature verification function that can verify the signature op, of party p on message m using the public key $vk_p$. UpdateST $(st_{i,j}=(id_{i,j}, b_i, b_j), z)=(st_{i,j}=(id_{i,j}+1, b_i-z, b_j+z))$ can be a state update function based on transaction amount z. When a state is updated, the transaction identifier $id_{i,j}$ can be incremented by 1 (or some other amount), the sender balance $b_i$ can be reduced by the transaction amount z, and the receiver balance $b_j$ can be increased by the transaction amount z.

$CR_{i,j}$ ($\phi^{(\tau)}(w, \Gamma)$, coin(q)) denotes a claim or refund transaction from sender party i to the recipient party j. $\phi^{(\tau)}$ denotes the condition of the transaction that takes as input a witness w with hard coded variables $\Gamma$. Upon providing a valid witness w by the recipient before time $\tau$, $\phi^{(\tau)}(w)$ returns an integer between 0 and the deposit amount q. The recipient may then be able to claim an amount coin ($\phi^{(\tau)}(w)$) of the claim or refund transaction and coin ($q-\phi^{(\tau)}(w)$) of the claim or refund transaction may be refunded to the sender. If no witness w is input into the conditions $\phi^{(\tau)}$ by time $\tau$, the full amount coin(q) may be refunded to the sender and the recipient may not be able to claim any portion of the claim or refund transaction.

Registration Phase

Figure 5:
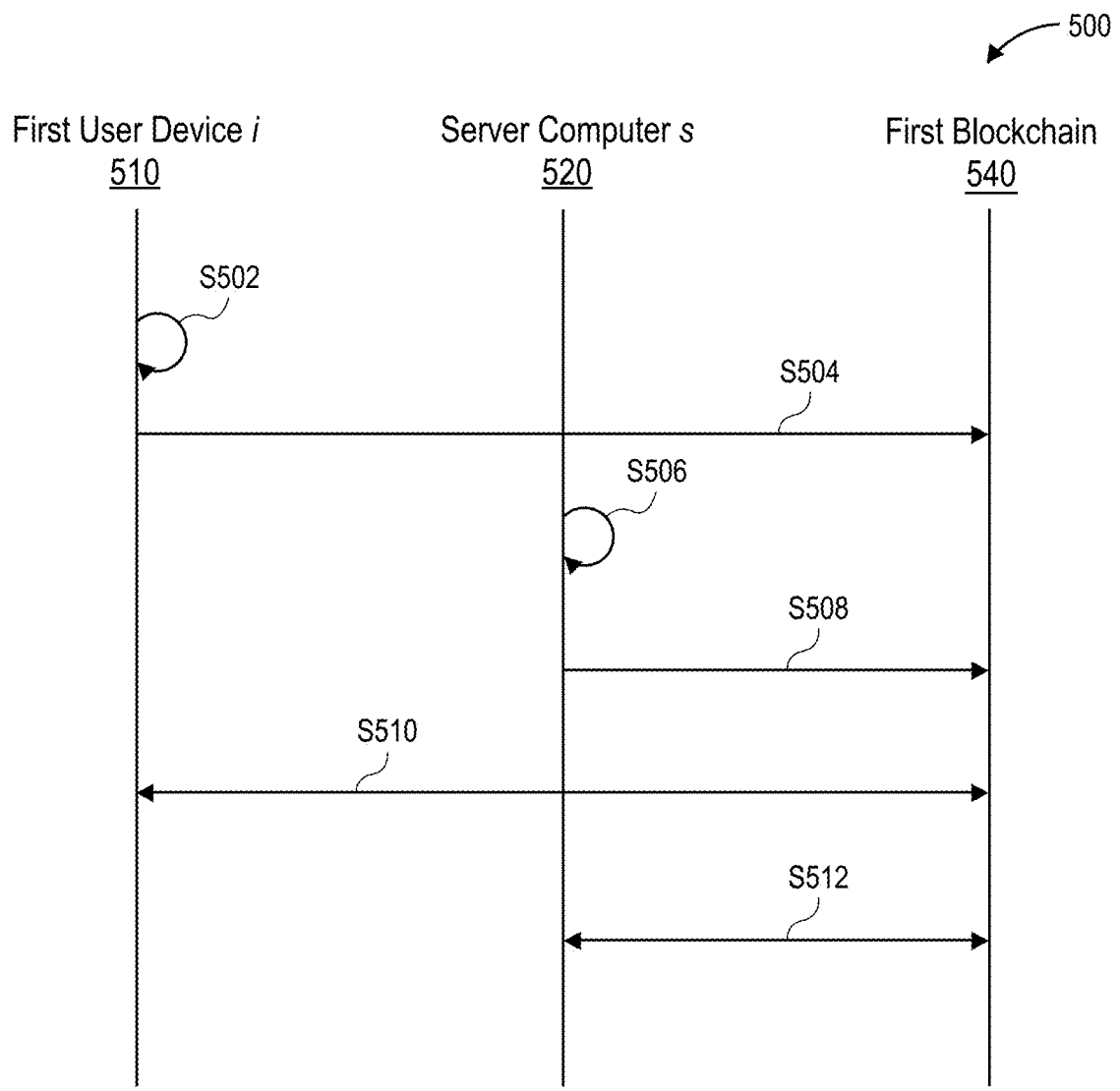
FIG. 5 shows a swim lane diagram of a registration process according to embodiments.

FIG. 5 shows a swim lane diagram of a registration process. Each user device (e.g., a first user device 510 and a second user device 630 (see FIG. 6)) may each perform the registration process. In some embodiments, each user device may already be registered with a blockchain. For example, the first user device 510 may have a wallet application associated with the first blockchain 540. The first application can store cryptographic keys for interacting with the blockchain. Each user device may also have an address (e.g., a public key or a hash of a public key) associated with the blockchain.

In some embodiments, prior to registration, each user device may complete an enrollment process. In the enrollment process, a user device (e.g., first user device 510) can send an enrollment message to the server computer 520. The enrollment message may comprise an identifier of the first user device 510 (e.g., a blockchain address of the first user device 510, a phone number, etc.), an identifier of the first blockchain 540, and a public key of the first user device $vk_i$. In some embodiments, enrollment may take place during registration. The server computer 520 can maintain an index of users that have enrolled with the first blockchain 540.

In step S502, the first user device i 510 can generate two user deposit transactions, $tx_1$ and $tx_3$. The first user deposit transaction $tx_1 \leftarrow CR_{i \rightarrow s}$ ($\psi_{i \rightarrow s,1}^{(\tau)}$ (_; $\Gamma$), coin(q)) may be a claim-or-refund transaction with deposit value q and first server conditions $\psi_{i \rightarrow s,1}^{(\tau)}$ for a first settlement time $\tau$. The second user deposit transaction $tx_3 \leftarrow CR_{i \rightarrow s}$ ($\psi_{i \rightarrow s,2}^{(\tau+1)}$, (_; $\Gamma$), coin(q)) may be a claim-or-refund transaction with deposit value q and second server conditions $\psi_{i \rightarrow s,2}^{(\tau+1)}$ for a second settlement time $\tau+1$. The conditions are described below.

In step S504, the first user device i 510 can post the user deposit transactions to the first blockchain 540. In posting, the first user device i 510 can send each deposit transaction to the first blockchain 540, and then each deposit transaction can be added to a block of the first blockchain 540. More specifically, the one or more computers or devices that are hosting the first blockchain 540 may add details regarding the deposit transaction to the first blockchain using a conventional blockchain additional protocol (e.g., see Nakamoto, S. (2008). *Bitcoin: A peer-to-peer electronic cash system*).

In step S506, the server computer s 520 can generate two server deposit transactions $tx_2$ and $tx_4$. The first server deposit transaction $tx_2 \leftarrow CR_{s \rightarrow i}$ ($\psi_{s \rightarrow i,1}^{(\tau)}$_; $\Gamma$), coin(q)) may be a claim-or-refund transaction with deposit value q and first user conditions $\psi_{s \rightarrow i,1}^{(\tau)}$ for a first settlement time $\tau$. The second server deposit transaction $tx_4 \leftarrow CR_{s \rightarrow i}$ ($\psi_{s \rightarrow i,2}^{(\tau+1)}$_; $\Gamma$), coin(q)) may be a claim-or-refund transaction with deposit value q and second user conditions $\psi_{s \rightarrow i,2}^{(\tau+1)}$ for a second settlement time $\tau+1$. The conditions are described below.

In step S508, the server computer s 520 can post the deposit transaction to the first blockchain 540. In posting, the server computer s 520 can send each deposit transaction to the first blockchain 540, then each deposit transaction can be added to a block of the first blockchain 540.

In step S510, the first user device i 510 can verify that the deposit transactions of the server computer s 520 were posted to the first blockchain 540. If the deposit transactions were not posted by first settlement time $\tau$, the first user device i 510 can abort the protocol. If the deposit transactions are posted before first settlement time $\tau$, the first user device i 510 can begin an authorization process for future transactions. In some embodiments, the first user device i 510 may receive a notification from the server computer s 520 when the server computer s 520 posts deposit transactions to the first blockchain 540. Then, the first user device i 510 may or may not verify that the deposit transactions are on the first blockchain 540.

In step S512, the server computers 520 can verify that the deposit transactions of the first user device i 510 were posted to the first blockchain 540. If the deposit transactions were not posted by time $\tau$, the server computer s 520 can abort the protocol. If the deposit transactions are posted before time $\tau$, the server computer s 520 can continue with an authorization process for future transactions. In some embodiments, the server computer s 520 may receive a notification from the first user device i 510 when the first user device i 510 posts deposit transactions to the first blockchain 540. Then, the server computer s 520 may or may not verify that the deposit transactions are on the first blockchain 540.

The server computer s 520 can perform a similar process with a second user device j and a second blockchain. In some embodiments, the server computer s 520 can perform the registration with a plurality of user devices and a plurality of blockchains. One or more user devices may have accounts with each blockchain, and thus the server computer s 520 may post multiple sets of deposit transactions to a particular blockchain. After posting transactions associated with the first user device i 510 to the first blockchain 540, the server computer s 520 can post the transactions associated with the second user device j to the second blockchain. In some embodiments, server computer s 520 can maintain an index of identifiers of registered devices.

After completing the registration process, each user device (e.g., the first user device i 510) may be able to perform a plurality of transactions with other users that have also registered with the server computer s 520 (e.g., the second user device j). The plurality of transactions may be carried out in the time between the end of registration and the first settlement time τ. In embodiments, r may be measured in minutes, hours, days, etc. A longer time span may be more convenient for users, as they may be able to complete many transactions before needing to re-register and post to the blockchain. However, a longer time span may also increases potential that an unauthorized user can attempt to conduct a fraudulent transaction.

After completing the registration process, the first user device i 510 and the server computer s 520 can be initialized with a first state $st_{i,s}=(id_{i,s}=0, b_i=q, b_s=q)$ comprising a first identifier $id_{i,s}$, a first user device balance $b_i$, and a first server balance $b_s$. Similarly, the second user device j and the server computer s 520 can be initialized with a second state $st_{j,s}=(id_{j,s}=0, b_j=q, b_s=q)$ comprising a second identifier $id_{j,s}$, a second user device balance $b_j$, and a second server balance $b_s$. In other embodiments, the identifier $id_{i,s}$ or $id_{j,s}$ may be initialized with a different initial value.

Authorization Phase

Figure 6:
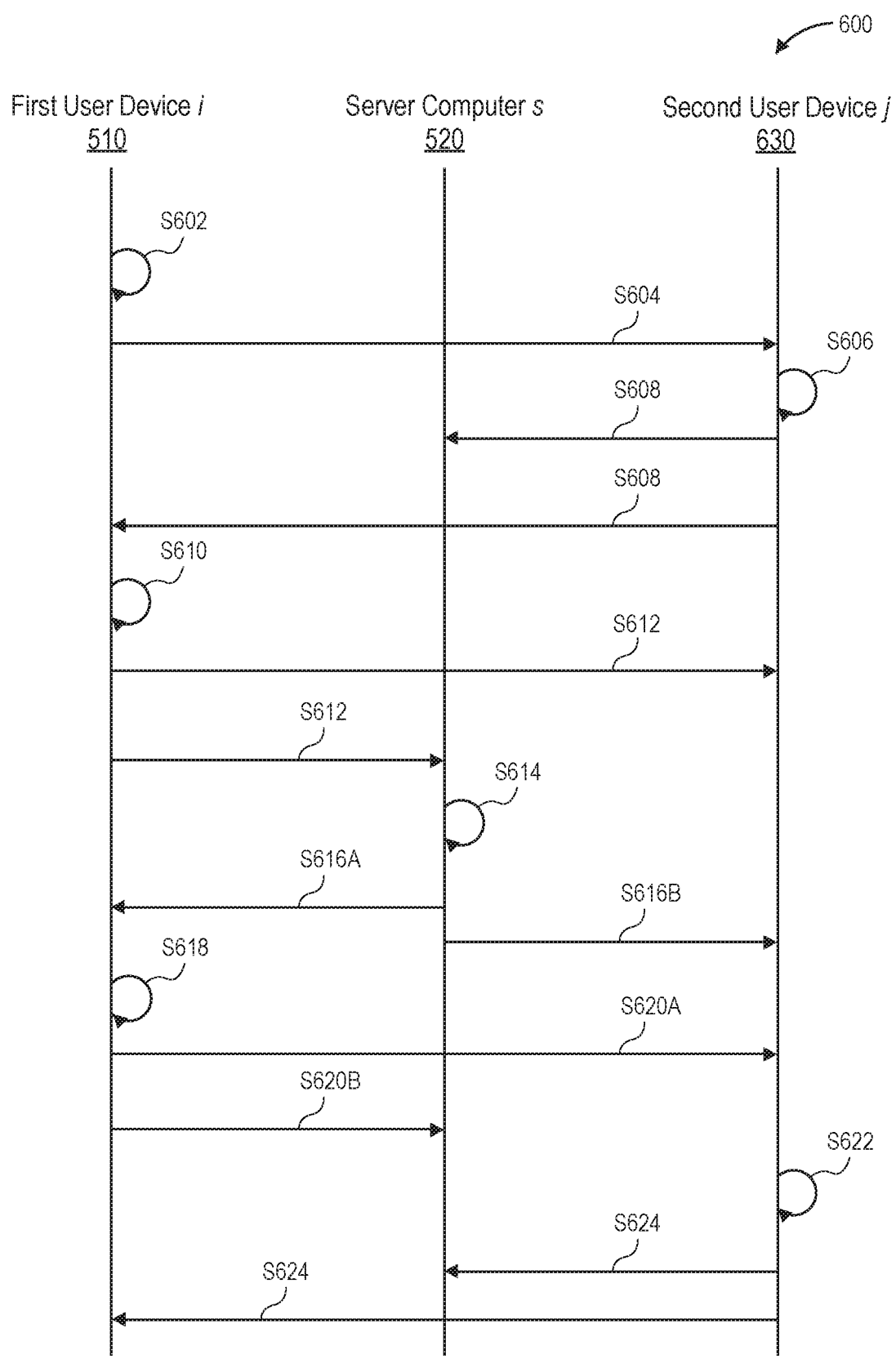
FIG. 6 shows a swim lane diagram of an authorization process according to embodiments.

FIG. 6 shows a swim lane diagram of an authorization process according to embodiments. During the authorization phase, three entities (e.g., two user devices and a server computer) may mutually agree on a transaction that is to occur. The transaction itself may then be completed during a subsequent payment phase. In embodiments, both first user device i 510 and second user device j 630 have already established a payment channel with server computer s 520 as described in the registration phase. Each transaction between the users may require a new authorization. However, multiple transactions may be carried out with the same registration within the first settlement time τ.

In embodiments, after registering, first user device i 510 wants to send coin(z) to second user device j 630 for some transaction amount z>0. The transaction amount z may be in units of a neutral currency (e.g., a cryptocurrency such as Bitcoin or a fiat currency such as U.S. dollars), while coin(z) can denote the transaction amount converted to an appropriate cryptocurrency. First user device i 510 and second user device j 630 may interpret coin(z) to be in the cryptocurrency that they use. For example, if first user device i 510 uses Bitcoin, coin(z) may be in Bitcoins, while if second user device j 630 uses Ethereum, coin(z) may be an equivalent quantity of Ether. Server computer s 520, having accounts with multiple cryptocurrencies, may interpret coin (z) in whichever cryptocurrency is appropriate for the context.

In step S602, first user device i 510 can generate an authorization initiation message. The authorization initiation message is intended to notify the recipient that an authorization process is about to occur, and to transmit relevant shared parameters. In step S602, the first user device i 510 can sample a private random first user string $h_i \leftarrow\$ \{0,1\}^\lambda$. $h_i$ may be a random binary string of length λ. First user device i 510 can then compute a first user hash image $H_i \leftarrow$ Hash ($h_i$) by hashing the first user string $h_i$ with the hash function Hash. First user device i 510 can then construct a message $m=(id_{i,j}, vk_i, vk_j, t, z, H_i)$ using a transaction identifier $id_{i,j}$, a first user public key $vk_i$ and a second user public key $vk_j$, a validity time t, the transaction amount z, and the first user hash image $H_i$. The validity time t can be the time by which second user device j 630 and server computer s 520 respectively are to complete a transaction that has been initiated by the first user device i 510. First user device i 510 can then sign the message m with the first user secret key $sk_i$ to generate a signature $\sigma_{i,m} \leftarrow$ Sign(m, $sk_i$).

In step S604, first user device i 510 can transmit the authorization initiation message (auth-init, m, $\sigma_{i,m}$) comprising the message m and the first user message signature $\sigma_{i,m}$ to second user device j 630. "auth-init" may be an indication to the second user device j 630 that the authorization process has been initiated.

In step S606, second user device j 630 upon receiving the tuple (auth-init, m, $\sigma_{i,m}$) can generate an authorization response message. Second user device j 630 can verify the first user message signature $\sigma_{i,m}$ of the message m using the first user public key $vk_i$ and signature verification function SigVerify ($vk_i$, m, $\sigma_{i,m}$). Second user device j 630 can also compare the first settlement time $\tau_{j,s}$ of the channel between second user device j 630 and server computer 520 to the validity time t in the message m by checking that $\tau_{j,s}$>m. t. Second user device j 630 can verify that the first settlement time $\tau_{j,s}$ is greater than the validity time t to ensure that the transaction can be completed before the transactions are settled. Second user device j 630 can also verify that the balance $st_{j,s}$. $b_s$ of server computer s 520, as stored in state $st_{j,s}$, minus the transaction amount m. z as stored in the message m, is greater than zero by $st_{j,s}$. $b_s$−m. z≥0. This can confirm that server computer s 520 has sufficient balance to transfer the transaction amount z.

In embodiment, the various times (e.g., the validity time) can be based upon absolute time or a relative time (e.g., relative to some initial timestamp).

Second user device j 630 may also maintain a value payflag$_s$ to track pending payments. If payflag$_s$=1, then there may be no previously pending transactions, and second user device j 630 can set payflag$_s \leftarrow 0$. Otherwise, if payflag$_s$=0, second user device j 630 can abort as second user device j 630 can be the recipient of another payment that has not been settled through server computer s 520. Then, second user device j 630 can sample a private random second user string $h_j \leftarrow\$ \{0,1\}^\lambda$. $h_j$ may be a random binary string of length λ. Second user device j 630 can then compute a second user hash image $H_j \leftarrow$ Hash ($h_j$) by hashing the second user string $h_j$ with the hash function Hash. After this, the second user device j 630 can construct a certificate tuple $C=(id_{i,j}, vk_i, vk_j, t, z, H_i, H_j)$. The certificate tuple C may be a tuple can comprise the transaction identifier $id_{i,j}$, the first user public key $vk_i$ and the second user public key $vk_j$, the validity time t, the transaction amount z, and the second user hash image $H_j$. Second user device j 630 can then sign the certificate tuple C with the second user secret key $sk_j$ to generate a second user certificate signature $\sigma_{j,C} \leftarrow$ Sign(C, $sk_j$).

In step S608, second user device j 630 can transmit a payee authorization message (auth-payee, C, $\sigma_{j,c}$) comprising the certificate tuple C and the second user certificate signature $\sigma_{j,c}$ to first user device i 510 and server computer s 520. "auth-payee" may be an indication to the first user device i 510 and server computer s 520 that the second user device j 630 accepts the authorization process. The authorization response message may be a second authorization response message of the second user device j 630.

In step S610, first user device i 510 upon receiving the payee authorization message (auth-payee, C, $\sigma_{j,c}$) can generate a payer authorization message. First user device i 510 can verify the second user certificate signature $\sigma_{j,C}$ of the certificate tuple C using the second user public key $vk_j$ and signature verification function SigVerify ($vk_j$, C, $\sigma_{j,c}$). First user device i 510 can also verify that all elements of the certificate tuple C are equal to the elements of the message m, except for the second user hash image $H_j$. First user device i 510 can then sign the certificate tuple C with the first user secret key $sk_i$ to generate a first user certificate signature $\sigma_{i,c} \leftarrow \text{Sign}(C, sk_i)$.

In step S612, first user device i 510 can transmit the payer authorization message (auth-payer, C, $\sigma_{i,c}$) comprising the certificate tuple C and the first user certificate signature $\sigma_{i,c}$ to the second user device j 630 and the server computer s 520. Thus, in embodiments, the payer authorization message may comprising a certificate tuple comprising at least a transaction identifier, the transaction amount, and a validity time. The payer authorization message may be concurrently or sequentially transmitted to the second user device j 630 and the server computer s 520.

In step S614, server computers 520, upon receiving the payee authorization message (auth-payee, C, $\sigma_{j,c}$) from second user device j 630 in step S608, can wait until validity time C. t to receive the payer authorization message (auth-payer, C', $\sigma_{i,c}'$) from first user device i 510 (in step S612). In embodiments, if the server computers 520 does not receive the payer authorization message (e.g., in step S612) by the validity time C. t, the server computer s 520 can abort the process. Otherwise, if server computers 520 receives both messages (e.g., the messages in steps S608 and S612) by validity time C. t, then the server computer s 520 can verify the second user certificate signature $\sigma_{j,c}$ and the first user certificate signature $\sigma_{i,c}'$ of the certificate tuples C and C' as received from second user device j 630 and first user device i 510, respectively, using SigVerify ($vk_j$, C, $\sigma_{j,C}$) and SigVerify ($vk_i$, C', $\sigma_{i,c}'$). Server computer s 520 can also compare the certificate tuple C' in the first authorization message to the certificate tuple C in the second authorization message by verifying that corresponding elements in certificate tuples C and C' are equal. This can confirm that both first user device i 510 and second user device j 630 are in agreement on the transaction that is to occur.

Then, the server computers 520 can check that in certificate tuple C, the validation time $\tau_{i,s}+1$ (one time step beyond the validation time $\tau_{i,s}$) is greater than the validation time C. t by $T_{i,s}+1>C$. t. Server computer s 520 can also verify that the first user device balance $b_i$ less the transaction amount z is greater than zero, by $st_{i,s}$. $b_i-z \geq 0$, to see that first user device i 510 has enough balance in order to complete the transaction. Further, server computer s 520 can check that the transaction identifier id is unique and has not been used before. In some embodiments, server computer s 520 may also maintain a value $payflag_i$ to track pending transactions. In some embodiments, if $payflag_i=1$, this may indicate that there are no previously pending transactions and server computer s 520 can set $payflag_i \leftarrow 0$ in response to receiving the first authorization message. Otherwise, if $payflag_i=0$, this may denote that first user device i 510 has an outstanding transaction that has not been settled yet and server computer s 520 can abort or wait until the transaction is settled.

Server computers 520 can then sign the certificate tuple C using the server secret key $sk_s$ to generate a server certificate signature $\sigma_{s,C} \leftarrow \text{Sign}(C, sk_s)$. Server computer s 520 can also construct a first user state tuple $S_i=(st_{i,s}, id_{i,j})$ comprising the state $st_{i,s}$ and the transaction identifier $id_{i,j}$, and then generate a server signature $\sigma_{s,S_i} \leftarrow \text{Sign}(S_i, sk_s)$ using the first user state tuple $S_i$ and the server secret key $sk_s$. Similarly, server computer s 520 can construct a second user state tuple $S_j=(st_{j,s}, id_{i,j})$ comprising the state $st_{j,s}$ and the transaction identifier $id_{i,j}$, and then generate a server signature $\sigma_{s,S_j} \leftarrow \text{Sign}(S_j, sk_s)$ using the second user state tuple $S_1$ and the server secret key $sk_s$. Note that the state $st_{i,s}$ comprises an additional transaction identifier $id_{i,s}$ and the state $st_{j,s}$ comprises an additional transaction identifier $id_{j,s}$.

In steps S616A and S616B, the server computers 520 can transmit a first server authorization message (auth-server, C, $S_i$, $\sigma_{s,C}$, $\sigma_{s,S_i}$) to first user device i 510 and a second server authorization message (auth-server, C, $S_j$, $\sigma_{s,C}$, $\sigma_{s,Sj}$) to the second user device j 630. Each of the first and second server authorization messages in steps 616A and 616B can comprise the certificate C, a user state tuple S, and server signatures of the tuples $\sigma_{s,C}$, $\sigma_{s,S}$. "auth-server" may be an indication to the first user device i 510 and the second user device j 630 that the server computer s 520 has authorized the transaction.

In step S618, first user device i 510 upon receiving the first server authorization message (auth-server, C, $S_j$, $\sigma_{s,C}$, $\sigma_{s,S_j}$) in step S616A can generate a first authorization complete message. First user device i 510 can verify the server certificate signature $\sigma_{s,C}$ and the server signature $\sigma_{s,S_i}$ of the certificate tuple C and the first user state tuple $S_i$ respectively using the server public key $vk_s$, SigVerify ($vk_s$, C, $\sigma_{s,C}$) and SigVerify ($vk_s$, $S_i$, $\sigma_{s,S_i}$). First user device i 510 can also check that all the fields of the certificate tuple C in the received tuple are equal to the (local) certificate tuple C sent in step S612. First user device i 510 can also verify that the transaction identifier $id_{i,j}$ in the certificate tuple C and the first user state tuple $S_i$ match using $C.id_{i,j}=S_i$. $id_{i,j}$, and that the state $st_{i,s}$ in the tuple $S_i$ matches the locally held state $st_{i,s}$ using $S_i$. $st_{i,s}=st_{i,s}$.

In steps S620A and S620B, first user device i 510 can transmit the first authorization complete message (auth-complete, C) comprising the certificate tuple C to the second user device j 630 and also to the server computer s 520. "auth-complete" may be an indication to the second user device j 630 and the server computer s 520 that the first user device i 510 has completed the authorization process.

In step S622, second user device j 630 upon receiving the second server authorization message (auth-server, C, $S_j$, $\sigma_{s,C}$, $\sigma_{s,S_j}$) in step S616, can generate a second authorization complete message. Second user device j 630 can verify the server certificate signature $\sigma_{s,C}$ and the server signature $\sigma_{s,S_j}$ of the certificate tuple C and the second user state tuple $S_j$ respectively using the public key $vk_s$, SigVerify ($vk_s$, C, $\sigma_{s,C}$) and SigVerify ($vk_s$, $S_j$, $\sigma_{s,S_j}$). Second user device j 630 can also check that all the elements of the certificate tuple C in the received tuple are equal to the (local) certificate tuple C sent in step S608. Second user device j 630 can also verify that the transaction identifier $id_{i,j}$ in the certificate tuple C and the second user state tuple $S_j$ match using $C.id_{i,j}=S_j$. $id_{i,j}$, and that the state $st_{i,s}$ in the second user state tuple $S_j$ matches the locally held state $st_{j,s}$ using $S_j$. $st_{j,s}=st_{j,s}$.

In step S624, the second user device j 630 can send the second authorization complete message (auth-complete, C) comprising the certificate tuple C to first user device i 510 and server computer s 520. This can indicate to the first user device i 510 and server computer s 520 that the authorization process is complete.

Payment Phase

Figure 7:
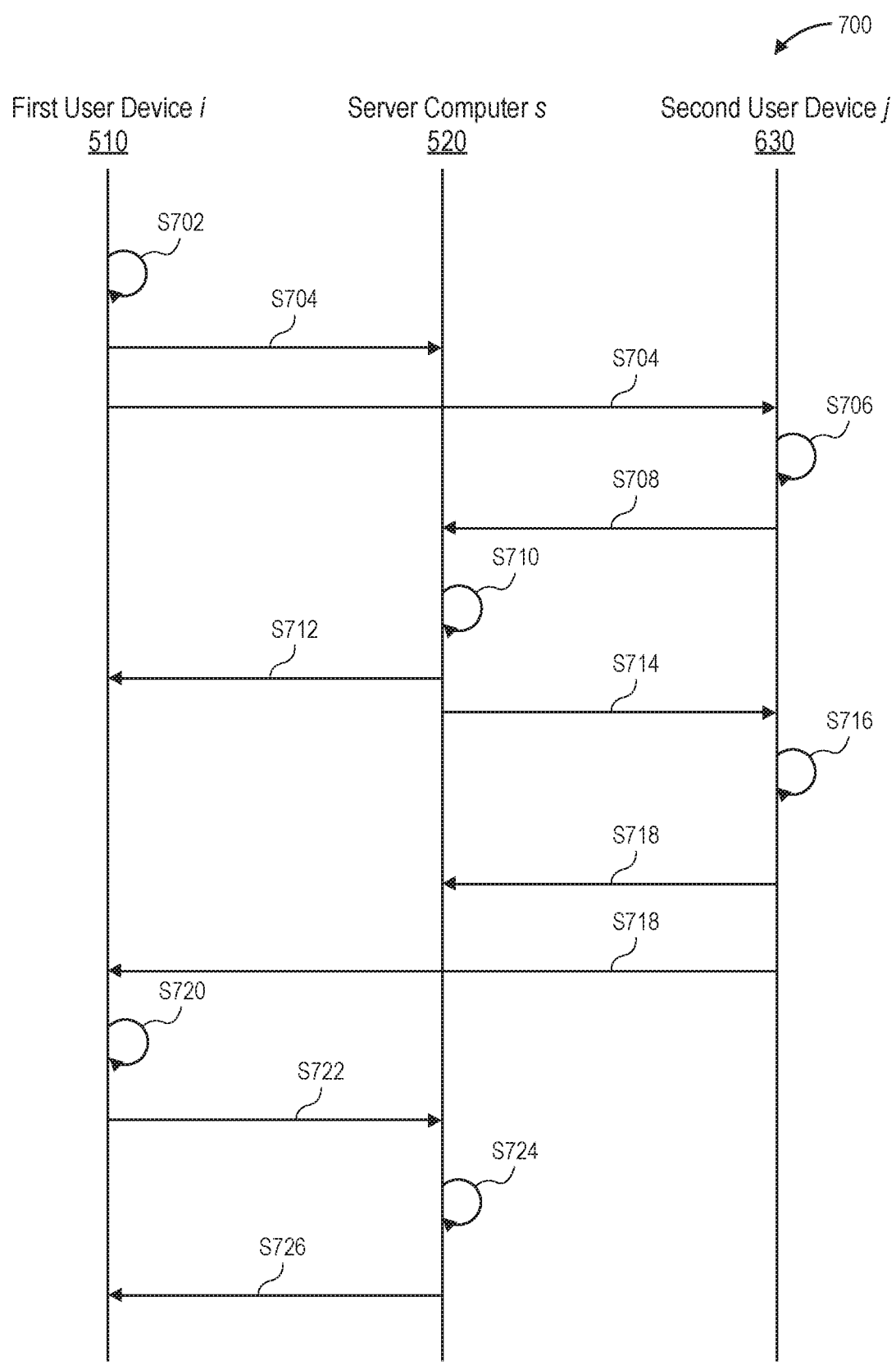
FIG. 7 shows a swim lane diagram of a payment process according to embodiments.

After completing the authorization phase, a payment phase may be performed. FIG. 7 shows a swim lane diagram of the payment phase according to embodiments. In embodiments, first user device i 510 may be sending a payment to second user device j 630.

In step S702, first user device i 510 can initialize a payment process and generate a payment initiation message. This may be done upon receiving the second authorization complete message (auth-complete, C) (in step S624) comprising the certificate tuple C from second user device j 630.

First user device i 510 can check that all the fields of the certificate tuple C in the received second authorization complete message tuple are equal to the (local) certificate tuple C sent in step S618 of FIG. 6. First user device i 510 can then construct a payment tuple P=(id$_{i,j}$, h$_i$) comprising the transaction identifier id$_{i,j}$ and first user string h$_i$.

In step S704, first user device i 510 can transmit the payment initiation message (pay-init, P) comprising the payment tuple P to the second user device j 630 and also to the server computer s 520.

In step S706, second user device j 630 upon receiving the payment initiation message tuple (pay-init, P) from first user device i 510 can generate a first payment pending message. Second user device j 630 can verify that the transaction identifier id$_{i,j}$ of the payment tuple P and the certificate tuple C match by P. id$_{i,j}$=C.id$_{i,j}$. Second user device j 630 can also verify the first user hash image H$_i$ of the certificate tuple C by hashing the first user string h$_i$ from the payment tuple P and comparing the result to the first user hash image H$_i$ by Hash (P. h$_i$)=C. H$_i$. Second user device j 630 can also verify that the current time CurrTime( ) is less than the validation time t by CurrTime( )<C. t, ensuring that the transaction is still valid.

In step S708, second user device j 630 can transmit the first payment pending message (pay-pending, P, h$_j$) comprising the payment tuple and the second user string h$_j$ to server computers 520.

In step S710, server computer s 520 can generate a second payment pending message and update its state in response to receiving the first payment pending message from the second user device j 630. Upon receiving the payment initiation message (pay-init, P) from first user device i 710 (in step S704), server computer s 520 can wait until the validation time C. t to receive the first payment pending message (pay-pending, P', h$_j$) from second user device j 630. If server computer s 520 does not receive the first payment pending message (pay-pending, P', h$_j$) from second user device j 630 before the validation time C. t, server computer s 520 can abort. Next, server computer s 520 can verify that the elements of the payment tuple P from first user device i 510 and the payment tuple P' in the first payment pending message agree by P=P'. Server computer s 520 can also verify that the transaction identifier P.id$_{i,j}$ of payment tuple P matches the transaction identifier C.id$_{i,j}$ of the certificate tuple C by P. id$_{i,j}$=C.id$_{i,j}$. Server computer s 520 can also verify the first user hash image H$_i$ and the second user hash image H$_j$ by hashing the first user string P.h$_i$ from the payment tuple P and the second user string h$_j$ and comparing the results to the first user hash image H$_i$ and the second user hash image H$_j$, respectively, by Hash (P. h$_i$)=C. H$_i$ and Hash (h$_j$)=C. H$_j$.

Server computers 520 can then update the second state st'$_{j,s}$←UpdateST (st$_{j,s}$, C. z) and sign the updated second state st'$_{j,s}$ with the server secret key sk$_s$, $\sigma_{s,st}$'← Sign(st'$_{j,s}$, sk$_s$). In updating the second state st$_{j,s}$, server computers 520 may increment the transaction identifier id$_{j,s}$ (e.g., adding one to the identifier), and may increase the second user balance b$_j$ of second user device j 630 by the transaction amount C. z and decrease the server balance b$_s$ of server computer s 520 by the transaction amount C. z.

In step S712, server computers 520 can transmit the second payment pending message (pay-pending, P, h$_j$) comprising the payment tuple P and the second user string h$_j$ to first user device i 510.

In step S714, server computers 520 can transmit a first state update message (pay-stUpdate, st'$_{j,s}$, $\sigma_{s,st}$') comprising the updated state st$_{j,s}$ and the server state signature $\sigma_{s,st}$' to second user device j 630.

In step S716, second user device j 630 can generate a transaction response message upon receiving the first state update message (pay-stUpdate, st'$_{j,s}$, $\sigma_{s,st}$') from server computer s 520. Second user device j 630 can verify the server state signature $\sigma_{s,st}$' of the updated state st'$_{j,s}$ with the server public key vk$_s$ by SigVerify (vk$_s$, st'$_{j,s}$, $\sigma_{s,st}$'). Second user device j 630 can also verify the correctness of the updated state st'$_{j,s}$ by updating the original (local) state st$_{j,s}$ with the transaction amount C. z, then comparing the result to the updated state st$_{j,s}$ by UpdateST (st$_{j,s}$, C. z)=st'$_{j,s}$. Second user device j 630 can then set the current state to be the received updated state, st$_{j,s}$←st'$_{j,s}$ and set the payment flag payflag$_s$←1. Updating payflag$_s$ can indicate that second user device j 630 has completed its portion of the transaction and has updated its state.

In step S718, if all the checks pass, second user device j 630 can transmit a first payment complete message (pay-complete, C) comprising the certificate tuple C to first user device i 510 and also to the server computer s 520. Otherwise, second user device j 630 can transmit a payment fail message (pay-fail, C) comprising the certificate tuple C to first user device i 510 and server computer s 520 and move to the first part of the settlement phase (step S804 of FIG. 8).

In step S720, first user device i 510 can update its state in response to receiving the first payment complete message (pay-complete, C) from second user device j 630. First user device i 510 can verify that the payment tuple P received from server computers 520 in step S712 matches the (local) payment tuple P' by P=P'. First user device i 510 can also verify the second user hash image H$_j$ of the certificate tuple C by hashing the second user string h$_j$ from the second payment pending message of step S712 and comparing the result to the second user hash image H$_j$ by Hash (h$_j$)=C. H$_j$. First user device i 510 can then update the state st'$_{i,s}$←UpdateST (st$_{i,s}$, C. z) with the original state st$_{i,s}$ and the transaction amount from the certificate tuple C. z. In updating the state st$_{i,s}$, first user device i 510 may increment the transaction identifier id$_{i,s}$ (e.g., adding one to the identifier), and may increase the server balance b$_s$ of server computer s 520 by the transaction amount C.z and decrease the first user device balance b$_i$ of first user device i 510 by the transaction amount C. z. The first user device i 510 can then generate a first user state signature $\sigma_{i,st}$'← Sign(st'$_{i,s}$, sk$_i$) with the updated state st'$_{i,s}$ and the first user secret key sk$_i$.

In step S722, first user device i 510 can transmit a second state update (pay-stUpdate, st'$_{i,s}$, $\sigma_{i,st}$') comprising the updated state st'$_{i,s}$ and the first user state signature $\sigma_{i,st}$' to server computer s 520. The second state update may be an example of a state update.

In step S724, server computer s 520 can update its state and generate a second payment complete message upon receiving the second state update message (pay-stUpdate, st'$_{i,s}$, $\sigma_{i,st}$') from first user device i 510. Server computer s 520 can verify the first user state signature $\sigma_{i,st}$' using the updated state st',s and the first user public key vk$_i$ by SigVerify (vk$_i$, st'$_{i,s}$, $\sigma_{i,st}$). Server computer s 520 can verify the correctness of the updated state st'$_{i,s}$ by updating the local state st$_{i,s}$ with the transaction amount in the certificate tuple C.z then comparing the result to the received updated state st'$_{i,s}$ by UpdateST (st$_{i,s}$, C. z)=st'$_{i,s}$. Server computer s 520 can then set the current state to be the updated state, st$_{i,s}$←st'$_{i,s}$. Server computer s 520 can also set the payment flag for first user device i 510, payflag$_i$←1 in response to receiving the state update. Updating payflag$_i$ can indicate that server computer s 520 has received the second state update and has updated its state.

In step S726, if all the checks above pass, server computers 520 can transmit a second payment complete message (payment-complete, C) comprising the certificate tuple to first user device i 510. Otherwise, server computer s 520 can transmit a payment fail message (payment-fail, C) comprising the certificate tuple to first user device i 510. The second payment complete message may be an example of a payment complete message.

In embodiments, each user device can follow the authorization and payment processes to perform a plurality of transactions after registering and before settling the transactions. The transactions may go in both directions (e.g., the first user device may transfer value to the second user device and the second user device may transfer value to the first user device). In some embodiments, all of the transactions may be between the same two user devices (e.g., first user device and second user device). In other embodiments, transactions may occur between multiple user devices. For example, the first user device may transfer value to the second user device and receive value from a third user device before settling transactions.

Settlement Phase

Figure 8:
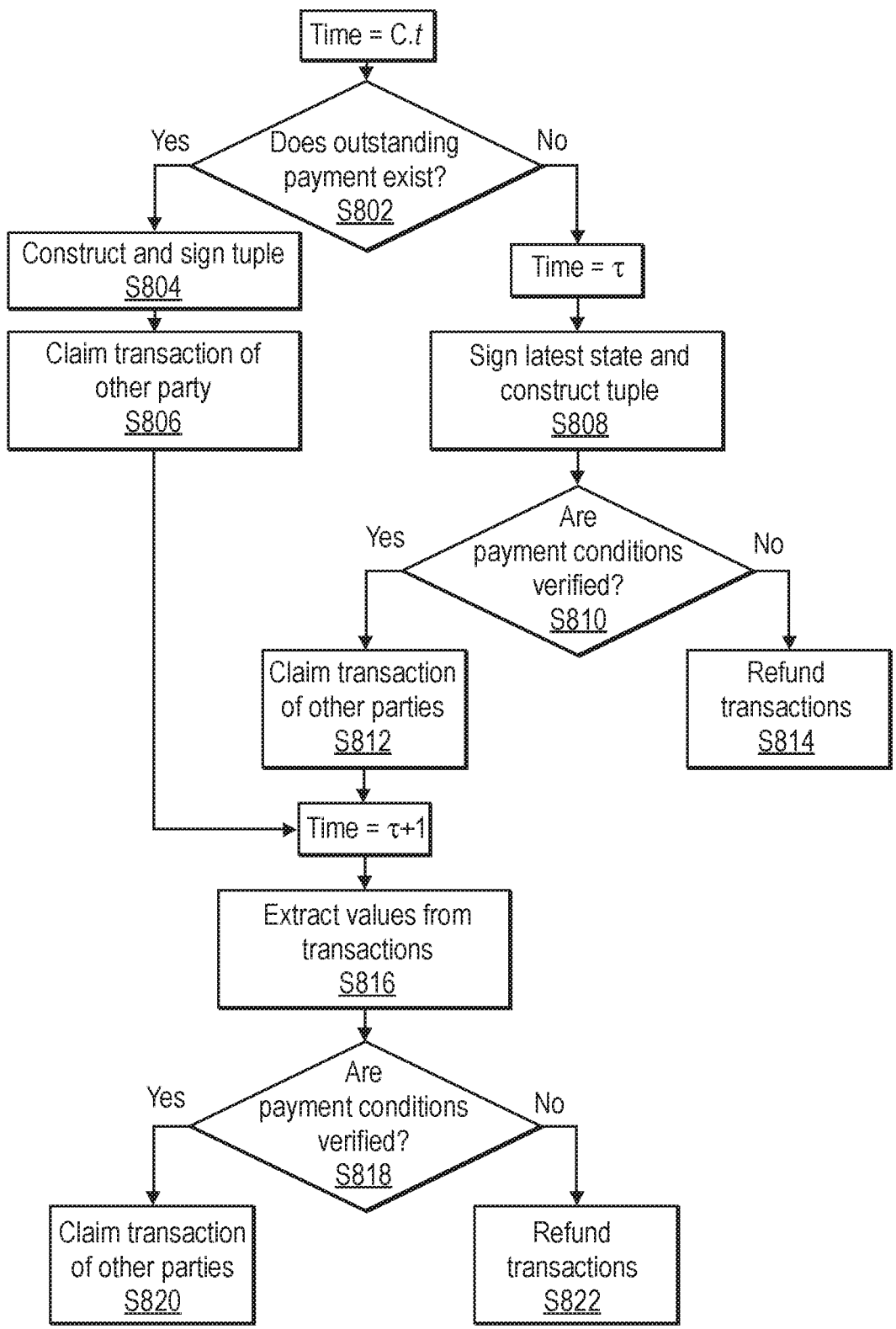
FIG. 8 shows a flow diagram of a settlement process according to embodiments.

FIG. 8 shows a flow diagram of a settlement process according to embodiments. The settlement process can occur after one transaction, or after a plurality of transactions. The settlement phase can occur between, for example, the first user device i 510 and the server computer s 520 (or the second user device j 630 and the server computer s 520). Parameters $\Gamma=(vk_i, vk_s, q)$ can comprise user public key $vk_i$, server public key $vk_s$, and deposit amount q. User state $st_{i,s}$ may be the latest state of the first user device i 510 and the server computer s 520. First user state signature $\sigma_{i,st}$ and server state signature $\sigma_{s,st}$ are the signatures of the first user device i 510 and the server computer s 520, respectively, for the latest state. Furthermore, a tuple (C, S, P), comprising the certificate tuple C, the state tuple S, and the payment tuple P, may comprise information about the latest outstanding payment between the first user device i 510 and the second user device j 630. The first user device i 510 and the server computer s 520 can each follow the steps of FIG. 8. For illustrative purposes, first user device i 510 will be described. The settlement process of server computer s 520 can be completed by a similar process.

At step S802, first user device i 510 can determine if there exists an outstanding payment (C, S, P), such that the state of the first user device i 510 has not been updated by server computer s 520 (e.g., the state update (pay-stUpdate, $st_{i,s}$, $\sigma_{s,st}$) has not been sent by server computer s) by validation time C. t.

If there is an outstanding transaction, the first user device i 510 goes to step S804. In some embodiments, the first user device i 510 can go to step S804 if there is not an outstanding transaction but it is suspected that server computer s 520 has acted fraudulently. The first user device i 510 can generate a signature $\sigma_{i,CS}$ of the tuple (C, S) comprising the certificate tuple C and the state tuple S using the first user secret key $sk_i$ by $\sigma_{i,CS} \leftarrow \text{Sign}((C, S), sk_i)$. The first user device i 510 can then construct a first witness $CT_i=(C, S, \sigma_{i,C}, \sigma_{j,C}, \sigma_{s,C}, \sigma_{s,S}, \sigma_{i,CS}, h_i, h_j)$ comprising the certificate tuple C, the state tuple S, the signatures $\sigma_{i,C}, \sigma_{j,C}, \alpha_{s,C}$ of the certificate tuple C from the first user device i 510, the second user device j 630, and the server computer s 520 respectively, the signature $\sigma_{i,CS}$ of the tuple (C, S), and the first user string $h_i$ and the second user string $h_j$ from the first user device i 510 and the second user device j 630 respectively. The second user string $h_j$ can be sent by the second user device j 630 within the payment tuple P. In some embodiments, the first user string $h_i$ is owned by first user device i 510. In some embodiments, where the server computer s 520 is settling the transaction, the first user string $h_i$ can be sent via the pay-pending message. In other embodiments, the first user string $h_i$ can be revealed in the first blockchain.

Similarly, the server computer s 520 may verify if there is an outstanding transaction. In some embodiments, the server computer s 520 may verify the existence of an outstanding transaction by checking the value of payflag$_i$. If payflag$_i$=1, then the server computer s 520 may know that the first user device i 510 has updated its state, and thus there is no outstanding transaction. If payflag$_i$=0, the server computer s 520 may assume that the first user device i 510 has not updated its state $st_{i,s}$ and thus there is an outstanding transaction.

At step S806, the first user device i 510 can verify the first user conditions $\psi_{s \rightarrow i,1}^{(\tau)}$ (_, $CT_i$; $\Gamma$) of the deposit transactions using the first witness $CT_i$ and the parameters $\Gamma$. After verifying the conditions, the first user device i 510 can process a server deposit transaction (which can include claiming and/or refunding the server deposit transaction) on the first blockchain 540.

In some embodiments, the first user conditions $\psi_{s \rightarrow i,1}^{(\tau)}$ ($ST_i$, $CT_i$; $\Gamma$) have another input, a second witness $ST_i$. In some embodiments, the second witness $ST_i$ may be input with null values, or may not be used as input. The first user conditions may be $$\psi_{s \rightarrow i,1}(ST_i, CT_i; \Gamma) = \text{Max}(\phi_{s \rightarrow i}(ST_i; \Gamma), X_{s \rightarrow i}(CT_i; \Gamma))$$

The first user conditions can take the maximum value of conditions $\phi_{s \rightarrow i}$ ($ST_i$; $\Gamma$), which may be the same conditions of the simple payment channel, and $X_{s \rightarrow i}$ ($CT_i$; $\Gamma$). In embodiments, where the witness $ST_i$ is not given (or has null values) the output of $\phi_{s \rightarrow i}$ ($ST_i$; $\Gamma$) may be 1, or some other default True value, and thus the first user conditions $\psi_{s \rightarrow i,1}^{(\tau)}$ (_, $CT_i$; $\Gamma$) may be reduced to $X_{s \rightarrow i}$ ($CT_i$; $\Gamma$). The conditions $X_{s \rightarrow i}$ ($CT_i$; $\Gamma$) may be defined as $$\chi_{s \rightarrow i}(CT_i; \Gamma) = \begin{pmatrix} \text{Verify}C(CT_i, \Gamma) \\ \wedge \text{SigVerify}(vk_i, (C, S), \sigma_{i,CS}) \\ \wedge (b_i + z) > q \end{pmatrix} \times ((b_i + z) - q)$$

The conditions $X_{s \rightarrow i}$ ($CT_i$; $\Gamma$) can comprise three terms combined using logical AND operators $\wedge$, then multiplied by a value $(b_i+z)-q$. The first term can be the verification of the certificate tuple C, outputting 1 if the certificate tuple is verified and 0 otherwise. Another term can be a verification the server tuple signature $\sigma_{s,CS}$ of the tuple (C, S) using the server public key $vk_s$m, outputting 1 if the signature is valid and 0 otherwise. Another term can verify that the current server balance $b_s$ plus the transaction amount z is greater than the deposit value q. The result of the terms (1 if all terms are "true", 0 if one or more of the terms are "false") can then be multiplied by the value $((b_i+z)-q)$, which can be greater than 0 if the server balance $b_i$ plus the transaction amount z is greater than the deposit value q, and less than 0 if the deposit value q is greater.

For example, the latest state of the first user device i 510 may be $st_{i,s}$=(id$_{i,s}$=1, $b_i$=7, $b_s$=13), and the first user device i 510 may construct the first witness $CT_i$ based on that state. The deposit value may be q=10, and the first user device i 510 may be sending z=3 to a second user device j 630. In this example, $X_{s \to i}$ (CT$_i$; Γ)=(1←1∧(7+3)>10)×(7+3−10)= (1∧1∧0)×0=0. In this example, all signatures may be assumed to be valid.

The verification of the certificate tuple C can be computed by a function VerifyC(CT$_i$, Γ) that takes as input the first witness CT$_i$ and the parameters Γ. The function can be defined as $$VerifyC(CT_i, \Gamma) = \begin{pmatrix} SigVerify(vk_i, C, \sigma_{i,C}) \wedge SigVerify(vk_j, C, \sigma_{j,C}) \wedge SigVerify(vk_s, C, \sigma_{s,C}) \\ \wedge (C.id_{i,j} = S.id_{i,j}) \wedge SigVerify(vk_s, S, \sigma_{s,S}) \\ \wedge (Hash(h_i) = H_i) \wedge (Hash(h_j) = H_j) \end{pmatrix}$$

In order to verify the certificate tuple C, a number of terms may be combined with logical AND operators ∧. The first terms may be to verify the signatures $\sigma_{i,C}$, $\sigma_{j,C}$, and $\sigma_{s,C}$ on the certificate tuple C using the first user public key $vk_i$, the second user public key $vk_j$, and the server public key $vk_s$, respectively. The next term may be to verify that the transaction identifier in the certificate tuple C, C. id$_{i,j}$ matches the transaction identifier in the state tuple S, S.id$_{i,j}$. Another term may be to verify the signature $\sigma_{s,S}$ on the tuple S using the public key $vk_s$. Other terms can include verifying that the first user string $h_i$ and the second user string $h_j$ hash to the first user hash image $H_i$ and the second user hash image $H_j$, respectively. If all terms result in a True value, then VerifyC(CT$_i$, Γ) may output True. If any of the terms result in a False value (e.g., one of the signatures is invalid, there is a mismatch in the transaction identifiers), then the output of VerifyC(CT$_i$, Γ) may be False.

Verifying the conditions may include evaluating the first user conditions with the first witness first witness CT$_i$ to compute a value. In embodiments, the value may be an integer. The conditions may then be verified if the value is greater than a threshold. For example, the conditions may be verified if the value is greater than 0. If the first user conditions $\psi_{s \to i,1}^{(\tau)}(\_, CT_i; \Gamma) > 0$ then the first user device i 510 can claim the corresponding transaction of server computers 520 (e.g., first server deposit transaction tx$_2$). In order to compute $\psi_{s \to i,1}^{(\tau)}(\_, CT_i; \Gamma)$ from $\psi_{s \to i,1}(\_, CT_i; \Gamma)$, the result of $\psi_{s \to i,1}(\_, CT_i; \Gamma)$ can be multiplied by the value (CurrTime( )<τ), which returns 1 if the current time is less than the first settlement time τ and 0 otherwise. Thus, if a transaction is not completed by the validity time C. t or the first settlement time τ, the party (e.g., server computer s 520) that failed to complete the protocol can lose its deposit transaction, which can help ensure compliance. Claiming the corresponding transaction based on the verification may comprise sending the witness or sending the witness or results of the verification to the blockchain. The blockchain can then initiate transferring the appropriate amount to accounts of the first user device i 510 and the server computer s 520. The amount transferred to the first user device i 510 may be the value output by the first user conditions and the difference between the value and the deposit value may be refunded to the server computer s 520. For example, with the example values, $\psi_{s \to i,1}^{(\tau)}(\_, CT_i; \Gamma)=0$, so the conditions may not be verified, so coin(0) may be claimed by the first user device i 510 and coin(10) may be refunded to the server computer s 520. The first user device can then wait until time τ+1 to move to step S816.

The server computer s 520 can perform a similar process and verify the first server conditions $\psi_{i \to s,1}$ (ST$_s$, CT$_s$; Γ).

After verifying the conditions, the server computer s 520 can process a user deposit transaction (which can include claiming and/or refunding the user deposit transaction) on the first blockchain 540. The first server conditions may be defined as $$\psi_{i \to s,1}(ST_s, CT_s; \Gamma) = \text{Max}(\phi_{i \to s}(ST_s; \Gamma), X_{i \to s}(CT; \Gamma))$$

The conditions $\phi_{i \to s}$ (ST$_s$; Γ) may be those of the simple payment channel. The other server conditions $X_{i \to s}$ (CT$_s$; Γ) may be defined as $$\chi_{i \to s}(CT_s; \Gamma) = \begin{pmatrix} VerifyC(CT_s, \Gamma) \\ \wedge SigVerify(vk_s, (C, S), \sigma_{i,CS}) \\ \wedge (b_s + z) > q \end{pmatrix} \times ((b_s + z) - q)$$

where VerifyC(CT$_s$, Γ)=VerifyC(CT$_i$, Γ). The server computer s 520 can then claim the corresponding transactions. Claiming the corresponding transaction based on the verification may comprise sending the witness or sending the witness or results of the verification to the blockchain. The blockchain can then initiate transferring the appropriate amount to accounts of the first user device i 510 and the server computer s 520. The amount transferred to the server computer s 520 may be the value output by the first server conditions and the difference between the value and the deposit value may be refunded to the first user device i 510. For example, the latest state of the server computer s 520 may be st$_{i,s}$=(id$_{i,s}$=1, b$_i$=7, b$_s$=13), and the first user device i 510 may construct the first witness CT$_s$ based on that state. In this example, $X_{i \to s}$ (CT$_s$; Γ)=(1∧1∧(13+3)>10)×(13+3−10)=(1∧1∧1)×6=6. In this example, all signatures may be assumed to be valid. Thus, $\psi_{s \to i,1}^{(\tau)}(\_, CT_i; \Gamma) > 0$, so the conditions can be verified, and coin(6) may be claimed by the server computer s 520 and coin(4) may be refunded to the first user device i 510.

If at step S802 the first user device i 510 determines that there are no outstanding transactions, and all transactions have been included in updated states, the first user device i 510 can go to step S808 and wait until time τ.

At step S808, the first user device i 510 can construct a second witness for verifying conditions. The first user device i 510 can then generate a first user state signature $\sigma_{i,st}$ of the state st$_{i,s}$ using the first user secret key sk$_i$ by $\sigma_{i,st} \leftarrow$ Sign(st$_i$, sk$_i$). The first user device i 510 can also generate a first user identifier signature $\sigma_{i,stid}$ of the tuple (st$_{i,s}$, id$_{i,s}$) comprising the state st$_{i,s}$ and the transaction identifier id$_{i,s}$ with the first user secret key sk$_i$ by $\sigma_{i,stid} \leftarrow$ Sign ((st$_{i,s}$, id$_{i,s}$), sk$_i$). The first user device i 510 can then construct a second witness ST$_i$=(st$_{i,s}$, $\sigma_{i,stid}$, $\sigma_{i,st}$, $\sigma_{s,st}$) comprising the latest state st$_{i,s}$, first user identifier signature $\sigma_{i,stid}$, and the signatures $\sigma_{i,st}$ and $\sigma_{s,st}$.

At step S810, the first user device i 510 can verify the first user conditions $\psi_{s \to i,1}^{(\tau)}$ (ST$_i$,_; Γ)>0 of the deposit transactions using the witness ST$_i$ and the parameters Γ. In some embodiments, the first user conditions $\psi_{s \to i,1}^{(\tau)}$ (ST$_i$, CT$_i$,_; Γ) have another input, the first witness CT$_i$. In some embodiments, the witness $CT_i$ may be input with null values, or may not be used as input. The first user conditions may be $$\psi_{s \to i,1}(ST_i, CT_i; \Gamma) = \text{Max}(\phi_{s \to i}(ST_i; \Gamma), X_{s \to i}(CT_i; \Gamma))$$

The first user conditions can take the maximum value of conditions $\phi_{s \to i}$ ($ST_i$; $\Gamma$), which may be the same conditions of the simple payment channel, and $X_{s \to i}$ ($CT_i$; $\Gamma$). In embodiments, where the first witness $CT_i$ is not given (or has null values) the output of $X_{s \to i}$ ($CT_i$; $\Gamma$) may be 1, or some other default True value, and thus the first user conditions $\psi_{s \to i,1}^{(\tau)}$ ($ST_i$,_; $\Gamma$) may be reduced to $\phi_{s \to i}$ ($ST_i$; $\Gamma$). The conditions $\phi_{s \to i}$ ($ST_i$; $\Gamma$) may be defined as $$\phi_{s \to i}(ST_i; \Gamma) = \begin{pmatrix} SigVerify(vk_i, st_{i,s}, \sigma_{i,st}) \wedge SigVerify(vk_s, st_{i,s}, \sigma_{s,st}) \\ \wedge SigVerify(vk_i, (st_{i,s}, id_{i,s}), \sigma_{i,stid}) \wedge \\ (b_s < b_i) \end{pmatrix} \times (b_i - q)$$

The first user conditions can include four terms combined with logical AND operators $\wedge$, the result multiplied by the difference between the first user device balance $b_i$ and the deposit value q. The first term can be a verification of the first user state signature $\sigma_{i,st}$ with the first user state $st_{i,s}$ and the first user public key $vk_i$, where the verification is 1 if the signature is valid and 0 if the signature is invalid. The second term can be a verification of the server state signature $\sigma_{s,st}$ with the first user state $st_{i,s}$ and the server public key $vk_s$, where the verification is 1 if the signature is valid and 0 if the signature is invalid. The third term can be a verification of the first user identifier signature $\sigma_{i,stid}$ with the tuple ($st_{i,s}$,$id_{i,s}$) and the first user public key $vk_i$, where the verification is 1 if the signature is valid and 0 if the signature is invalid. The fourth term can compare the server balance $b_s$ to the first user balance $b_i$, outputting 1 if the server balance $b_s$ is less than the first user balance $b_i$ and 0 otherwise. In order to compute $\psi_{s \to i,1}^{(\tau)}$ ($ST_i$,_; $\Gamma$) from $\psi_{s \to i,1}$ ($ST_i$,_; $\Gamma$), the result of $\psi_{s \to i,1}$ ($ST_i$,_; $\Gamma$) can be multiplied by the value (CurrTime( )<r), which returns 1 if the current time is less than the first settlement time $\tau$ and 0 otherwise.

For example, the latest state of the first user device may be $st_{i,s}$=($id_{i,s}$=1, $b_i$=7, $b_s$=13), and the first user device i 510 may construct the second witness $ST_i$ based on that state. The deposit value may be q=10, and the first user device i 510 may be sending z=3 to a second user device. In this example, $\phi_{s \to i}$ ($ST_i$; $\Gamma$)=(1$\wedge$1$\wedge$1$\wedge$13<7)×(7−10)= (1$\wedge$1$\wedge$1$\wedge$0)×−3=0. In this example, all signatures may be assumed to be valid.

Verifying the conditions may include evaluating the first user conditions with the second witness $ST_i$ to compute a value. In embodiments, the value may be an integer. The conditions may then be verified if the value is greater than a threshold. For example, the conditions may be verified if the value is greater than 0. If the first conditions are verified, the first user device i 510 can go to step S812. If $\psi_{s \to i,1}^{(\tau)}$ ($ST_i$,_; $\Gamma$)>0, then the first user device i 510 can claim the corresponding transaction (e.g., first server deposit transaction $tx_2$). Claiming the corresponding transaction based on the verification may comprise sending the witness or sending the witness or results of the verification to the blockchain. The blockchain can then initiate transferring the appropriate amount to the first user device and the server. The amount transferred to the first user device i 510 may be the value output by the first user conditions and the difference between the value and the deposit value may be refunded to the server computer s 520. With the example values, $\psi_{s \to i,1}^{(\tau)}$ ($ST_i$,_; $\Gamma$)<0, so the conditions may not be verified, so coin(0) may be claimed by the first user device and coin(10) may be refunded to the server computer.

If the first conditions are not verified (e.g., if the value output by the first conditions is 0 or less than 0), the first user device i 510 can go to step S814. The transactions of the first user device i 510 can be refunded (e.g., $tx_1$ for party i and $tx_2$ for party s). In embodiments, if $tx_1$ and $tx_2$ are not claimed at time $\tau$ they can be refunded to the first user device i 510 and the server computer s 520 respectively. The first user device i 510 can then wait until the next time step, $\tau$+1.

Similarly, the server computers 520 can verify the first server conditions $\psi_{i \to s,1}$ ($ST_s$, $CT_s$; $\Gamma$). The first server conditions may be defined as $$\psi_{i \to s,1}(ST_s, CT_s; \Gamma) = \text{Max}(\phi_{i \to s}(ST_s; \Gamma), X_{i \to s}(CT_s; \Gamma))$$

The first server conditions can take the maximum value of conditions $\phi_{s \to i}$ ($ST_i$; $\Gamma$), which may be the same conditions of the simple payment channel, and $X_{s \to i}$($CT_i$; $\Gamma$). In embodiments, where the first witness $CT_i$ is not given (or has null values) the output of $X_{s \to i}$ ($CT_i$; $\Gamma$) may be 1, or some other default True value, and thus the first user conditions $\psi_{i \to s,1}^{(\tau)}$ ($ST_s$; $\Gamma$) may be reduced to $\phi_{i \to s}$ ($ST_s$; $\Gamma$). The conditions $\phi_{i \to s}$ ($ST_s$; $\Gamma$) may be defined as $$\phi_{i \to s}(ST_s; \Gamma) = \begin{pmatrix} SigVerify(vk_i, st_{i,s}, \sigma_{i,st}) \wedge SigVerify(vk_s, st_{i,s}, \sigma_{s,st}) \\ \wedge SigVerify(vk_s, (st_{i,s}, id_{i,s}), \sigma_{s,stid}) \wedge \\ (b_s > b_i) \end{pmatrix} \times (b_s - q)$$

For example, the latest state of the server computer may be $st_{i,s}$=($id_{i,s}$=1, $b_i$=7, $b_s$=13), and the first user device i 510 may construct the second witness $ST_s$ based on that state. In this example, $\phi_{i \to s}(ST_s; \Gamma)$=(1$\wedge$1$\wedge$1$\wedge$13>7)×(13−10)= (1$\wedge$1$\wedge$1$\wedge$1)×3=3. In this example, all signatures may be assumed to be valid. Thus, $\psi_{s \to i,1}^{(\tau)}$ (_, $CT_i$; $\Gamma$)>0, so the conditions can be verified, and coin(3) may be claimed by the server computer s 520 and coin(7) may be refunded to the first user device i 510. Note that, in this example, after both the first user device i 510 and the server computer s 520 have claimed $tx_1$ and $tx_2$ with second witnesses $ST_i$ and $ST_s$, the total amount claimed by or refunded to the first user device i 510 is coin(7) and the total amount claimed by or refunded to the server computer s 520 is coin(13), aligning with the state $st_{i,s}$=($id_{i,s}$=1, $b_i$=7, $b_s$=13).

At step S816, at time $\tau$+1, the first user device i 510 can extract the witnesses $ST_s$, $CT_s$ from $tx_1$ and $ST_i$, $CT_i$ from $tx_2$. In some embodiments, if one or more of the witnesses $ST_i$, $ST_s$, $CT_i$, or $CT_s$ were not used to verify the conditions of a transaction, they may not be extracted. The first user device i 510 may also verify that both $tx_1$ and $tx_2$ are claimed.

At step S818, the first user device i 510 may attempt to verify the second conditions. The second conditions may be $$\psi_{s \to i,2}(ST_s, CT_s, ST_i, CT_i; \Gamma) = \text{CheckID}((ST_i, CT_i), (ST_s, CT_s)) \times \psi_{s \to i,1}(ST_i, CT_i; \Gamma)$$

The second conditions may comprise the result of the conditions CheckID (($ST_i$, $CT_i$), ($ST_s$, $CT_s$)) multiplied by the results of the first conditions $\psi_{s \to i,1}$ ($ST_i$, $CT_i$; $\Gamma$). In embodiments where one or more of the witnesses $ST_i$, $ST_s$, $CT_i$, or $CT_s$ are not extracted from the transactions, they may be input into the conditions as a True value (or a null value). The condition CheckID (($ST_i$, $CT_i$), ($ST_s$, $CT_s$)) can comprise $$CheckID((ST_i, CT_i), (ST_s, CT_s)) =$$

$$\begin{pmatrix} (\phi_{s \to i}(ST_i; \Gamma) > \chi_{s \to i}(CT_i; \Gamma) \wedge \phi_{i \to s}(ST_s; \Gamma) > \chi_{i \to s}(CT_s; \Gamma) \wedge ST_i.id_{i,s} > ST_s.id_{i,s}) \vee \\ (\phi_{s \to i}(ST_i; \Gamma) > \chi_{s \to i}(CT_i; \Gamma) \wedge \chi_{i \to s}(CT_s; \Gamma) > \phi_{i \to s}(ST_s; \Gamma) \wedge ST_i.id_{i,s} > CT_s.id_{i,s}) \vee \\ (\chi_{s \to i}(CT_i; \Gamma) > \phi_{s \to i}(ST_i; \Gamma) \wedge \phi_{i \to s}(ST_s; \Gamma) > \chi_{i \to s}(CT_s; \Gamma) \wedge CT_i.id_{i,s} > ST_s.id_{i,s}) \vee \\ (\chi_{s \to i}(CT_i; \Gamma) > \phi_{s \to i}(ST_i; \Gamma) \wedge \chi_{i \to s}(ST_s; \Gamma) > \phi_{i \to s}(CT_s; \Gamma) \wedge CT_i.id_{i,s} > CT_s.id_{i,s}) \end{pmatrix}$$

Four terms can be combined with logical OR operators ∨, each term comprising three terms combined with logical AND operators ∧. Some terms may compare user conditions and server conditions (e.g., $\phi_{s \to i}(ST_i; \Gamma) > X_{s \to i}(CT_i; \Gamma)$). Other terms may compare the state identifier $id_{i,s}$ from the witnesses. In embodiments where one of the witnesses are not input, terms that include the witness may default to a true value. For example, if there were no pending state updates, and thus only $ST_i$ and $ST_s$ were used to verify the first conditions, all the condition comparison terms may default to true. However, none of the state identifier $id_{i,s}$ comparison term may be true, thus CheckID ((ST$_i$,_), (ST$_s$,_)) may output false if the same state is used. In embodiments, CheckID ((ST$_i$, CT$_i$), (ST$_s$, CT$_s$)) may be true if there is a mismatch in the state identifiers $id_{i,s}$, which may occur if one or both parties submitted a state that is not the most accurate state. If CheckID ((ST$_i$, CT$_i$), (ST$_s$, CT$_s$)) is true, this may indicate that one or more of the parties were dishonest. Then, CheckID ((ST$_i$, CT$_i$), (ST$_s$, CT$_s$)) multiplied by the first user conditions $\psi_{s \to i,1}$ (ST$_i$, CT$_i$; Γ) may result in a nonzero value, if the first user conditions $\psi_{s \to i,1}$ (ST$_i$, CT$_i$; Γ) were nonzero, and thus some value may be transferred, to compensate for the offending party. If the states were updated properly, CheckID ((ST$_i$, CT$_i$), (ST$_s$, CT$_s$)) may be zero, and thus $\psi_{s \to i,2}$ (ST$_s$, CT$_s$, ST$_i$, CT$_i$; Γ) may be zero. Then the deposit value of the second transactions may be refunded to the first user device i 510, no longer needed as collateral for the transaction.

If the second conditions are verified (e.g., $\psi_{s \to i,2}^{(\tau+1)}$ (ST$_s$, CT$_s$, ST$_i$, CT$_i$; Γ)>0) the first user device i 510 can go to step S820 and claim the corresponding transaction (e.g., tx$_3$ for party s and tx$_4$ for party i).

If the second conditions are not verified, the first user device i 510 can go to step S822. The transactions of each party can be refunded (e.g., tx$_3$ for first user device i 510 and tx$_4$ for server computer s 520). For the example values, if both the first user device i 510 and the server computer s 520 use the same state st$_{i,s}$, then $\psi_{s \to i,2}^{(\tau+1)}$ (ST$_s$, CT$_s$, ST$_s$, CT$_i$; Γ)=0 (and $\psi_{i \to s,2}$ (ST$_s$, CT$_s$, ST$_i$, CT$_i$; Γ)=0), so neither conditions may be verified. Then tx$_3$ can be refunded to first user device i 510 as coin(10) and tx$_4$ can be refunded to server computer s 520 as coin(10). First user device i 510 may then have a total balance of coin(17), which is equal to the coin(20) that they first deposited, less the coin(3) that was transferred to second user device j 630 through the server computer s 520. Server computer s 520 may then have a total balance of coin(23), or coin(3) greater than the coin(20) that they first deposited. Similarly, if tx$_3$ and tx$_4$ are not claimed at time τ+1 they will be refunded to the first user device i 510 and the server computer s 520 respectively.

The server computer s 520 may perform a similar process with the second server conditions $$\psi_{i \to s,2}(ST_s,CT_s,ST_i,CT_i;\Gamma)=CheckID((ST_s,CT_s),(ST_i, CT_i)) \times \psi_{s \to i,1}(ST_i,CT_i;\Gamma)$$

where CheckID ((ST$_s$, CT$_s$), (ST$_i$, CT$_i$)) comprises the same terms as CheckID ((ST$_i$, CT$_i$), (ST$_s$, CT$_s$)), but with reversed comparisons of the state identifiers (e.g., ST$_i$. $id_{i,s}$<ST$_s$. $id_{i,s}$ instead of ST$_i$. $id_{i,s}$>ST$_s$. $id_{i,s}$)

Corresponding conditions for outstanding payments between second user device j 630 and server computer s 520 can be derived by replacing appropriate terms related to first user device i 510 with those related to second user device j 630.

Embodiments of the invention can provide an number of advantages. One advantage is that embodiments can enable transactions between two different cryptocurrencies. Other systems may be specific to a particular pairing of cryptocurrencies, but embodiments can be generalized to any pair of cryptocurrencies. Another advantage is that there is not a central trusted authority to enable the interaction, which can fit the requirements of cryptocurrencies.

Embodiments can be secure and robust, for example, by providing many levels of signatures and verification. Additionally, embodiments can maintain that security even if some devices in the system are compromised by an unauthorized party such as a fraudster. The conditions described above can ensure that the correct, latest state is the one used to complete the transaction. These can prevent a fraudster from attempting to claim a transaction using a prior state.

Embodiments also provide these transactions in an efficient manner. Communicating with a blockchain can be a time intensive process, with each message potentially requiring several minutes or hours in order to be added to a block in the blockchain. In particular, sending a large number messages for verifying the transaction can result in a process that takes hours in order to complete a single transaction. Instead, embodiments can transmit a number of the messages in the protocol over other secure communication channels that do not involve the blockchain. That is, in embodiment, multiple transactions can be conducted between two user devices using a new messaging scheme, without the need to write to write each and every message to a blockchain. Further, although it could be used, mining need not be used in embodiments of the invention. This can result in a faster process that can be more efficient.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising, the following steps:
   a) posting, by a user device to a blockchain, a deposit transaction comprising a deposit value and conditions;
   b) updating, by the user device, a state according to a transaction amount;
   c) transmitting, by the user device, a state update of the state to a server computer;
   d) responsive to step c), receiving, by the user device, a payment complete message from the server computer;
   e) verifying, by the user device, the conditions by
      constructing a witness comprising the state,
      evaluating the conditions with the witness to output a value, and
      verifying if the value is greater than a threshold; and
   f) processing, by the user device, a server deposit transaction on the blockchain in response to verifying.

2. The method of claim 1, wherein the user device is a first user device, the payment complete message comprises a tuple and is a second payment complete message, and the tuple is a certificate tuple, and wherein the method further comprises the following steps between steps a) and b):
   transmitting, by the first user device, a payer authorization message to a second user device, the payer authorization message comprising the certificate tuple comprising a transaction identifier, the transaction amount, and a validity time;
   transmitting, by the first user device, the payer authorization message to the server computer;
   receiving, by the first user device, a first server authorization message comprising the tuple from the server computer;
   receiving, by the first user device, a second authorization complete message comprising the tuple from the second user device;
   transmitting, by the first user device, a payment initiation message comprising the transaction identifier to the second user device and the server computer; and
   receiving, by the first user device, a first payment complete message comprising the tuple from the second user device.

3. The method of claim 2, wherein prior to verifying the conditions, the method comprises:
   verifying that the first payment complete message and the second payment complete message were received before the validity time.

4. The method of claim 1, wherein processing the server deposit transaction comprises claiming the value from the deposit value, and wherein the difference between the deposit value and the value is refunded to the server computer.

5. The method of claim 1, wherein the deposit transaction is a first deposit transaction and the conditions are first conditions, the method further comprising:
   posting, by the user device to the blockchain, a second deposit transaction comprising the deposit value and second conditions.

6. The method of claim 5, wherein the method further comprises:
   verifying, by the user device, the second conditions, and wherein the posting of the second deposit transaction to the blockchain is based on the verification of the second conditions.

7. The method of claim 5, wherein the second conditions depend on the first conditions.

8. A user device comprising:
   a processor; and
   a non-transitory computer-readable medium comprising code, executable by the processor, for implementing a method comprising at least the steps of:
   a) posting, to a blockchain, a deposit transaction comprising a deposit value and conditions;
   b) updating a state according to a transaction amount;
   c) transmitting a state update of the state to a server computer;
   d) responsive to step c), receiving a payment complete message from the server computer;
   e) verifying the conditions by
      constructing a witness comprising the state,
      evaluating the conditions with the witness to output a value, and
      verifying if the value is greater than a threshold; and
   f) processing a server deposit transaction on the blockchain in response to verifying.

9. The user device of claim 8, wherein the user device is a first user device, the payment complete message comprises a tuple and is a second payment complete message, wherein the tuple is a certificate tuple, and wherein the method further comprises the following steps between steps a) and b):
   transmitting a payer authorization message to a second user device, the payer authorization message comprising the certificate tuple comprising a transaction identifier, the transaction amount, and a validity time;
   transmitting the payer authorization message to the server computer;
   receiving a first server authorization message comprising the tuple from the server computer;
   receiving a second authorization complete message comprising the tuple from the second user device;
   transmitting a payment initiation message comprising the transaction identifier to the second user device and the server computer; and
   receiving a first payment complete message comprising the tuple from the second user device.

10. The user device of claim 9, wherein the method further comprises:
    determining a current time; and
    aborting the method if the current time is greater than the validity time.

11. The user device of claim 9, wherein the method further comprises, prior to transmitting the payer authorization message:
    computing a hash of a random string;
    generating an authorization initiation message comprising the hash, the transaction identifier, the transaction amount, and the validity time;
    transmitting the authorization initiation message to the second user device; and
    receiving, from the second user device, a payee authorization message comprising the tuple.

12. The user device of claim 8, wherein if the conditions are not verified, processing the server deposit transaction comprises refunding the server deposit transaction to the server computer.

13. The user device of claim 8, wherein if the method is aborted, the deposit transaction is refunded to the user device.

14. The user device of claim 8, wherein the state comprises an identifier, a user device balance, and a server balance and wherein updating the state comprises:
   incrementing the identifier;
   decreasing the user device balance by the transaction amount; and
   increasing the server balance by the transaction amount.

15. The user device of claim 8, wherein the user device is a mobile phone.

16. A method comprising at least the steps of:
   a) posting, by a server computer to a blockchain, a deposit transaction comprising a deposit value and conditions;
   b) receiving, by the server computer from a user device, a state update;
   c) updating, by the server computer, a state according to a transaction amount;
   d) transmitting, by the server computer to the user device, a payment complete message;
   e) verifying, by the server computer, the conditions by constructing a witness comprising the state,
      evaluating the conditions with the witness to output a value, and
      verifying if the value is greater than a threshold; and
   f) processing, by the server computer, a server deposit transaction on the blockchain in response to verifying.

17. The method of claim 16, wherein the user device is a first user device, wherein the blockchain is a first blockchain, the deposit transaction is a first deposit transaction, and the conditions are first conditions, and wherein the payment complete message is a second payment complete message, the method further comprising between steps a) and b):
   posting, by the server computer to a second blockchain, a second deposit transaction comprising the deposit value and second conditions;
   receiving, by the server computer from a second user device, a payee authorization message, the payee authorization message comprising a tuple comprising a transaction identifier, a transaction amount, and a validity time by which a transaction response is to be received;
   receiving, by the server computer from the first user device, a payer authorization message comprising the tuple;
   comparing, by the server computer, the tuple in the payee authorization message and the tuple in the payer authorization message;
   transmitting, by the server computer to the first user device, a first server authorization response message comprising the tuple;
   transmitting, by the server computer to the second user device, a second server authorization message comprising the tuple;
   receiving, by the server computer from the first user device, a payment initiation message comprising the transaction identifier; and
   receiving, by the server computer from the second user device, a first payment complete message comprising the transaction identifier.

18. The method of claim 17, further comprising:
   setting, by the server computer, a flag to zero in response to receiving the payer authorization message; and
   setting, by the server computer, the flag to one in response to receiving the state update.

19. The method of claim 17, wherein the state is a first state, wherein the first state comprises a first identifier, a first user device balance, and a first server balance, and a second state comprising a second identifier, a second user device balance, and a second server balance.

20. The method of claim 19, further comprising:
   updating, by the server computer, the first state in response to receiving the payment initiation message by incrementing the first identifier, decreasing the first user device balance by the transaction amount, and increasing the first server balance by the transaction amount; and
   updating, by the server computer, the second state in response to receiving the first payment complete message by incrementing the second identifier, decreasing the second server balance by the transaction amount, and increasing the second user device balance by the transaction amount.

* * * * *